(12) United States Patent
Costin et al.

(10) Patent No.: US 12,514,847 B2
(45) Date of Patent: Jan. 6, 2026

(54) OXATHIAZIN_DIOXIDE FOR TREATING, PREVENTING, INHIBITING OR REDUCING CYTOKINE RELEASE

(71) Applicant: Geistlich Pharma AG, Wolhusen (CH)

(72) Inventors: James C. Costin, Phoenixville, PA (US); Hanns Moehler, Maennendorf (CH); Thomas Mueller, Wolhusen (CH)

(73) Assignee: Geistlich Pharma AG, Wolhusen (CH)

( * ) Notice: Subject to any disclaimer, the term of this patent is extended or adjusted under 35 U.S.C. 154(b) by 936 days.

(21) Appl. No.: 17/612,957

(22) PCT Filed: May 21, 2020

(86) PCT No.: PCT/IB2020/054854
§ 371 (c)(1),
(2) Date: Nov. 19, 2021

(87) PCT Pub. No.: WO2020/234830
PCT Pub. Date: Nov. 26, 2020

(65) Prior Publication Data
US 2022/0323423 A1 Oct. 13, 2022

Related U.S. Application Data

(60) Provisional application No. 62/851,409, filed on May 22, 2019.

(51) Int. Cl.
| | | |
|---|---|---|
| A61K 31/436 | (2006.01) | |
| A61K 31/4365 | (2006.01) | |
| A61K 45/06 | (2006.01) | |
| A61P 29/00 | (2006.01) | |
| A61P 31/00 | (2006.01) | |
| A61P 37/00 | (2006.01) | |

(52) U.S. Cl.
CPC ........ *A61K 31/436* (2013.01); *A61K 31/4365* (2013.01); *A61K 45/06* (2013.01); *A61P 29/00* (2018.01); *A61P 31/00* (2018.01); *A61P 37/00* (2018.01)

(58) Field of Classification Search
None
See application file for complete search history.

(56) References Cited

U.S. PATENT DOCUMENTS

| | | | | |
|---|---|---|---|---|
| 9,241,943 B2* | 1/2016 | Pfirrmann | ............ | C07D 291/06 |
| 9,624,187 B2* | 4/2017 | Pfirrmann | ............ | C07D 419/06 |
| 9,844,555 B2* | 12/2017 | Pfirrmann | ............ | A61K 9/0053 |
| 2018/0370932 A1 | 12/2018 | Pfirrmann | | |
| 2019/0091233 A1 | 3/2019 | Redmond et al. | | |
| 2021/0189336 A1* | 6/2021 | Primo Ramos | .... | G01N 33/5011 |

FOREIGN PATENT DOCUMENTS

| | | |
|---|---|---|
| JP | 2018-502909 A | 2/2018 |
| JP | 2019-508476 A | 3/2019 |
| WO | 2013/190355 A1 | 12/2013 |
| WO | 2016098054 A1 | 6/2016 |
| WO | 2017158570 A1 | 9/2017 |

OTHER PUBLICATIONS

McNicholas, S., Talento, A.F., O'Gorman, J. et al. Cytokine responses to *Staphylococcus aureus* bloodstream infection differ between patient cohorts that have different clinical courses of infection. BMC Infect Dis 14, 580 (2014). (Year: 2014).*
Neary et al. The Evolving Role of Taurolidine in Cancer Therapy, Ann Surg Oncol (2010) 17: 1135-1143 (Year: 2017).*
Frei E III, Eder JP. Principles of Dose, Schedule, and Combination Therapy. In: Kufe DW, Pollock RE, Weichselbaum RR, et al., editors. Holland-Frei Cancer Medicine. 6th edition. Hamilton (ON): BC Decker; 2003. Chapter 44. Available from: https://www.ncbi.nlm.nih.gov/books/NBK12635/ (Year: 2003).*
Borrega et al. In the Eye of the Storm: Immune-mediated Toxicities Associated With CAR-T Cell Therapy. HemaSphere 3(2):p. e191, Apr. 2019. |DOI: 10.1097/HS9.0000000000000191 (Year: 2019).*
Wang et al. A Novel Porcine Model of Septic Shock Induced by Acute Respiratory Distress Syndrome due to Methicillin-resistant *Staphylococcus aureus*, Chin Med J, published 2017. (Year: 2017).*
International Search Report and Written Opinion issued for International Application No. PCT/IB2020/054854 on Aug. 13, 2020, 9 pages.
Buchholz et al., Innovative substance 2250 as a highly promising anti-neoplastic agent in malignant pancreatic carcinoma—in vitro and in vivo, BMC Cancer, 2017, vol. 17, No. 1, 13 pages.
Tatjana et al., Taurolidine and congeners activate hTRPA1 but not hTRPV1 channels and stimulate CGRP release from mouse tracheal sensory nerves, Pharmacology Research & Perspectives, 2016, vol. 4, No. 1, pp. e00204, 8 pages.
Notice of Allowance dated Jul. 4, 2023 issued in corresponding Canadian Patent Application No. 3,141,035. (1 pages).
Notification to Grant Patent Right for Invention dated Jun. 24, 2024 issued in corresponding Chinese Patent Application No. 2020800481217. (4 pages).
Intention to Grant dated Oct. 15, 2024 issued in corresponding European Patent Application No. 20730737.2. (7 pages).
Decision to Grant a Patent dated Oct. 21, 2024 issued in corresponding Japanese Patent Application No. 2021568994. (5 pages).

* cited by examiner

*Primary Examiner* — James H Alstrum-Acevedo
*Assistant Examiner* — Lauren Wells
(74) *Attorney, Agent, or Firm* — Rothwell, Figg, Ernst & Manbeck, P.C.

(57) ABSTRACT

A method of preventing, inhibiting or reducing cytokine release and the incidence of a cytokine release syndrome (CRS) or a cytokine storm in a subject with certain oxathiazin-like compounds and/or related compounds.

16 Claims, 25 Drawing Sheets

OXATHIAZIN_DIOXIDE FOR TREATING, PREVENTING, INHIBITING OR REDUCING CYTOKINE RELEASE

CROSS REFERENCE TO RELATED APPLICATION

This application is a 35 U.S.C. 371 National Phase Entry Application from PCT/IB2020/054854, filed May 21, 2020, which claims the benefit of U.S. Provisional Application No. 62/851,409 filed on May 22, 2019, the disclosures of which are incorporated herein in their entirety by reference.

FIELD OF THE DISCLOSURE

This disclosure relates to compositions and methods for treating, inhibiting, preventing or reducing cytokine release, cytokine release syndrome (CRS) or a cytokine storm in a subject.

BACKGROUND

Cytokines are small, secreted proteins necessary for immune cell signaling, activation, and recruitment of other inflammatory cells. Cytokines may be secreted by various types of cells in response to various conditions, diseases, disorders, treatments, and agents. Cytokines are small secreted proteins released by cells have a specific effect on the interactions and communications between cells. Cytokine is a general name; other names include lymphokine (cytokines made by lymphocytes), monokine (cytokines made by monocytes), chemokine (cytokines with chemotactic activities), and interleukin (cytokines made by one leukocyte and acting on other leukocytes). Cytokines may act on the cells that secrete them (autocrine action), on nearby cells (paracrine action), or in some instances on distant cells (endocrine action). There are both pro-inflammatory cytokines and anti-inflammatory cytokines. Certain cytokines/chemokines are involved in various diseases, disorders and conditions.

Cytokine release syndrome (CRS) is a systemic inflammatory response that can be triggered by a variety of factors such as infections and certain drugs. Cancer immunotherapy may include adoptive transfer of T cells with chimeric antigen receptors (CAR) targeting cancer cells (e.g., B cells with antigen CD19 in B cell leukemia), bispecific antibodies targeting cancer cells (e.g., BlinCyto linking CD3 of T-cells with CD19 of B cells for treating B cell leukemia) or high dose IL2 (e.g. for treating melanoma). These immunotherapies are often accompanied by short term toxicity or potentially life threatening CRS as well as neurotoxicity. CRS results from the activation of myeloid cells by activated T cells. CRS was observed when the anti-T-cell antibody muromonab-CD3 (OKT3) was introduced into the clinic as an immunosuppressive treatment for solid organ transplantation. Subsequently, CRS has been described after infusion of several antibody-based therapies such as anti-thymocyte globulin (ATG), the CD28 superagonist TGN1412, rituximab, obinutuzumab, alemtuzumab, brentuximab, dacetuzumab, and nivolumab. CRS has also been observed following administration of non-protein-based cancer drugs such as oxaliplatin and lenalidomide. Furthermore, CRS was reported in the setting of haploidentical donor stem cell transplantation, and graft-versus-host disease.

While standard treatments for cancer are surgery, chemotherapy, and radiation therapy, improved methods, such as targeted immunological therapies, are currently being developed and tested. One promising technique uses adoptive cell transfer (ACT), in which immune cells are modified to recognize and attack tumors. One example of ACT is when a patient's own T-cells, or a donor's, are genetically engineered to express a chimeric antigen receptor (e.g., CAR T-cells) targeted to a tumor specific antigen expressed on the surface of the tumor cells. These CAR T-cells are then cytotoxic only to cells expressing the tumor specific antigen. With the success of the newer T cell-engaging immunotherapeutic agents there has been a growing interest in CRS since it represents one of the most frequent serious adverse effects of these therapies. T cell-engaging immunotherapies include bispecific antibody constructs and chimeric antigen receptor (CAR) T cell therapies. Both these immunotherapeutic strategies have recently been carried forward into clinical application and have shown impressive therapeutic activity in several hematologic malignancies, such as acute lymphoblastic B cell leukemia (B-ALL), chronic lymphocytic leukemia (CLL), and diffuse large B cell lymphoma (DLBCL).

Recently, the first two CAR T cell therapies tisagenlecleucel and axicabtagene ciloleucel received FDA approval for refractory CD19-positive B-ALL and relapsed or refractory large B-cell lymphoma. Multiple other bispecific antibody and CAR T cell constructs that target a variety of antigens are currently in clinical development. Furthermore, there are a number of related T cell-engaging and other immune cell immunotherapeutic approaches in earlier clinical development. These include dual-affinity re-targeting antibodies (DART), immune-mobilising monoclonal T-cell receptors (TCRs) against cancer (ImmTAC), and other TCR-based strategies.

Studies of the first T cell-engaging therapies, i.e., blinatumomab and CD19-targeted CAR T cells, revealed that CRS is a serious adverse event of these therapies. Thus, most of the current CRS data is derived from CAR T cell and blinatumomab studies in hematologic malignancies where CRS has been reported in frequencies of up to 100% in CD19-targeted CAR T cell trials, sometimes with fatal outcome. In CRS, infused, activated T-cells produce a systemic inflammatory response in which there is a rapid and massive release of cytokines into the bloodstream, leading to dangerously low blood pressure, high fever and shivering.

In severe cases of CRS, patients experience a "cytokine storm" (a.k.a. cytokine cascade or hypercytokinemia), in which there is a positive feedback loop between cytokines and white blood cells with highly elevated levels of cytokines. This can lead to potentially life-threatening complications including cardiac dysfunction, adult respiratory distress syndrome, neurologic toxicity, renal and/or hepatic failure, pulmonary edema and disseminated intravascular coagulation.

Cytokine storms are also a problem after other infectious and non-infectious stimuli.

In CRS or a cytokine storm, numerous proinflammatory cytokines, such as interleukin-1 (IL-1), IL-6, gamma interferon (g-IFN, IFN-g or IFN-γ), and tumor necrosis factor-α (TNFα), are released, resulting in hypotension, hemorrhage, and, ultimately, multiorgan failure. The symptoms caused by cytokine storms vary from a rash or fever to neurotoxicity. This syndrome has been also known to occur in advanced or terminal cases of severe acute respiratory syndrome (SARS), Epstein-Barr virus-associated hemophagocytic lymphohistiocytosis, gram-negative sepsis, influenza, malaria and numerous other infectious diseases, including Ebola infection. Cytokine release, cytokine storms or CRS may also stem from non-infectious causes, such as acute pancreatitis, severe burns or trauma, or acute respiratory distress syndrome.

To date, corticosteroids, biological therapies such as anti-IL6 therapies and anti-inflammatory drugs are being evaluated to control cytokine release syndrome and cytokine storm in patients administered immunotherapy such as CAR T-cell therapy. However, such agents have typically been found to negatively affect response rates to T cell-engaging therapies and eventually lead to relapse. Steroids may effect CAR T-cells' activity and/or proliferation and put the patients in danger of sepsis and opportunistic infections. Anti-inflammatory drugs may not be effective in controlling cytokine release syndromes or cytokine storms, because the cytokine storm includes a very large number of cytokines while there is limited ability to infuse patients with anti-inflammatory drugs.

The FDA has expanded the indications of tocilizumab (ACTEMRA®) from its original designation of rheumatoid arthritis (RA) treatment to include treating CRS in patients undergoing CAR T treatment. Tocilizumab works by blocking the interleukin-6 (IL-6) receptor, an inflammatory cytokine, but it does not inhibit release of cytokines. As such, tocilizumab provides relief from some symptoms in some subjects but there is much room for improvement. The approval of tocilizumab for the treatment of CAR T cell-induced severe or life-threatening CRS in adults and in pediatric patients 2 years of age and older was based on a retrospective data analysis in two cohorts, showing response rates of 53%-69%. FDA approval for tocilizumab was only supported by a literature review. Further, tocilizumab is a monoclonal antibody against a single cytokine receptor, IL6, but CRS and cytokine storms involve multiple cytokines including, but not limited to, e.g., TNF-α, interferon gamma, interleukins, e.g., IL-1β, IL-2, IL-8, and IL-10 in addition to IL-6.

Thus, there is a long-felt and unmet need for new compositions and methods to treat, inhibit, control, reduce and prevent cytokine release, including in conditions such as cytokine release syndrome and cytokine storms. There is a long-felt and unmet need for a broad-spectrum cytokine release inhibitor, and particularly for a cytokine release inhibitor that does not reduce the target tumor cell cytotoxicity of anti-cancer therapies.

SUMMARY OF THE INVENTION

In one aspect, the present disclosure provides a method of treating, preventing, inhibiting, or reducing an increase in blood levels of one or more cytokines in a subject in need thereof by administering a composition of the present disclosure to the subject.

In one aspect, the present disclosure provides a method of treating, preventing, inhibiting or reducing the incidence of a cytokine release syndrome (CRS) or a cytokine storm in a subject by administering a composition of the present disclosure to the subject.

In one aspect, the present disclosure provides a method of treating preventing, inhibiting or reducing neurotoxicity of a CAR T-cell therapy, antibody therapy, or a bispecific antibody therapy in a subject by administering a composition of the present disclosure to the subject.

In one aspect, the present disclosure provides a method of treating, preventing, reducing or inhibiting cytokine production in a subject experiencing cytokine release syndrome or cytokine storm or vulnerable to cytokine release syndrome or cytokine storm by administering a composition of the present disclosure to the subject.

In one aspect, the present disclosure provides a method of treating one or more symptoms or adverse reactions triggered by an infectious disease or a disease condition that triggers a widespread release of cytokines in a subject by administering a composition of the present disclosure to the subject.

In one aspect, the present disclosure provides a method of increasing the maximum tolerable dose of a T cell-engaging immunotherapeutic drug administered to a subject by administering a composition of the present disclosure to the subject.

In one aspect, the present disclosure provides a method of treating, inhibiting, preventing or treating vascular leakage in a subject in need thereof by administering a composition of the present disclosure to the subject.

In one aspect, the present disclosure provides a method of treating cardiomyopathy, and/or myocardial dysfunction in a subject at risk thereof due to cytokine release, a cytokine release syndrome, or a cytokine storm by administering a composition of the present disclosure to the subject.

In some aspects, the cause of the cytokine release, cytokine release syndrome or cytokine storm may include an infectious stimulus, condition, or syndrome. In some aspects, the cause of the cytokine release, cytokine release syndrome or cytokine storm may include a non-infectious stimulus, condition, or syndrome. In some aspects, the cause of the cytokine release, cytokine release syndrome or cytokine storm may include a combination of an infectious stimulus, condition, or syndrome and a non-infectious stimulus, condition, or syndrome.

In some aspects, the cause of the cytokine release, cytokine release syndrome or cytokine storm may include at least one of viral, bacterial, fungal, helminthic, protozoan, or infectious agent.

In some aspects, at least one of IL-1β, IL-1RA, IL-2, IL-4, IL-6, IL-8, IL-10, IL-12, IP-10, IFN-α, IFN-γ, G-CSF, and TNF-α is reduced in the subject.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various exemplary and non-limiting aspects of the subject matter of this disclosure.

FIG. 10B shows the effect of C-2250 on BLINCYTO® T-cell mediated IL-2 cytokine release in the tested donors.

DETAILED DESCRIPTION

Figure 1A:
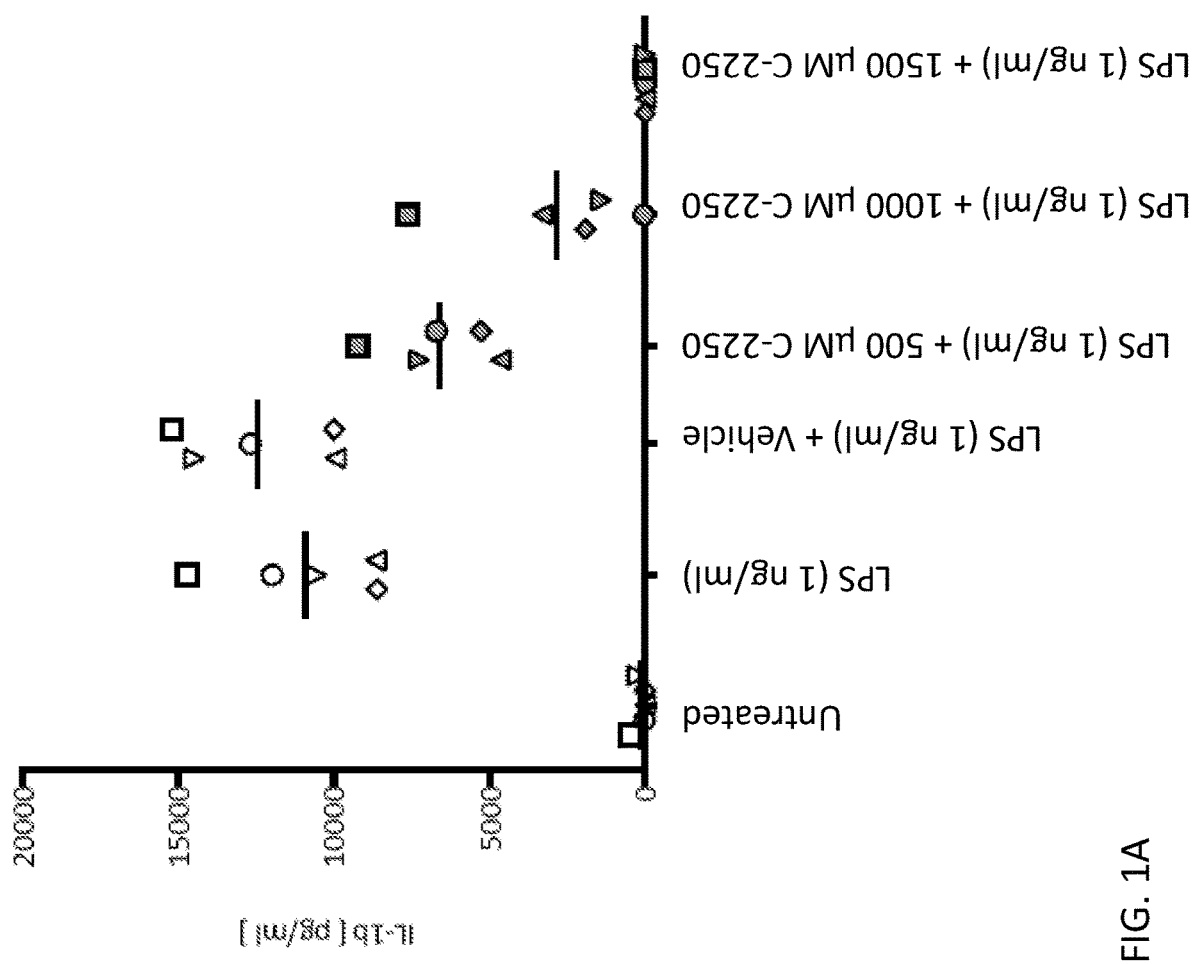
FIG. 1A shows LPS Simulated Human PBMC at 48 hours, IL-1β.

While aspects of the subject matter of the present disclosure may be embodied in a variety of forms, the following description and accompanying drawings are merely intended to disclose some of these forms as specific examples of the subject matter encompassed by the present disclosure. Accordingly, the subject matter of this disclosure is not intended to be limited to the forms or aspects so described and illustrated.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific aspects of the invention, but their usage does not delimit the invention, except as outlined in the claims.

Cytokines are small, secreted proteins necessary for immune cell signaling, activation, and recruitment of other inflammatory cells. Some examples of cytokines include IL-1β, IL-1RA, IL-2Rα, IL-2, IL-4, IL-6 IL-8, IL-10, IL-12, IL-17, IL-18, IP-10, IFN-α, IFN-γ, MCP-3, MCP-1, M-CSF, G-CSF, MIP-la, and TNF-α. Some examples of chemokines include CCL5, CXCL8, CXCL1, CXCL2, CXCL10, CCL2, CCL7, CXCL6, CXCL11, CCL2, CCL3, CCL4, CCL7, CCL8, and CCL20. Certain cytokines/chemokines are involved in various diseases, disorders and conditions.

Cytokine release syndrome is a form of systemic inflammatory response syndrome that arises as a complication of some diseases or infections, and is also an adverse effect of some monoclonal antibody drugs, as well as immunotherapies, such as adoptive T-cell therapies. Cytokine release syndrome is a condition that may occur after treatment with some types of immunotherapy, such as monoclonal antibodies and CAR-T cells. Cytokine release syndrome is caused by a large, rapid release of cytokines into the blood from immune cells affected by the immunotherapy. Cytokines are immune substances that have many different actions in the body. Signs and symptoms of cytokine release syndrome include fever, nausea, headache, rash, rapid heartbeat, low blood pressure, and trouble breathing. Most patients have a mild reaction, but sometimes, the reaction may be severe or life threatening.

The Common Terminology Criteria for Adverse Events classifications for CRS are as follows: Grade 1: Mild reaction, infusion interruption not indicated; intervention not indicated; Grade 2: Therapy or infusion interruption indicated but responds promptly to symptomatic treatment (e.g., antihistamines, NSAIDS, narcotics, IV fluids); prophylactic medications indicated for <=24 hrs; Grade 3: Prolonged (e.g., not rapidly responsive to symptomatic medication and/or brief interruption of infusion); recurrence of symptoms following initial improvement; hospitalization indicated for clinical sequelae (e.g., renal impairment, pulmonary infiltrates); Grade 4: Life-threatening consequences; pressor or ventilatory support indicated; Grade 5: Death.

The National Cancer Institute has developed a grading scheme for the severity of CRS: Grade 1 includes fever and constitutional symptoms, Grade 2 includes hypotension responding to fluids/low dose vasopressors and Grade 2 organ toxicities, Grade 3 includes shock requiring high dose/multiple vasopressors, hypoxia ≥40% Fraction of inspired oxygen (FiO2) and Grade 3 organ toxicities, and Grade 4 includes the need for mechanical ventilation and Grade 4 organ toxicities.

As used herein, the term "cytokine storm" refers to the dysregulation of pro-inflammatory cytokines leading to adverse events, toxicity and disease and has been referred to as a "cytokine storm," "cytokine release syndrome" or "inflammatory cascade". Often, a cytokine storm or cascade is referred to as being part of a sequence because one cytokine typically leads to the production of multiple other cytokines that can reinforce and amplify the immune response. Generally, these pro-inflammatory mediators have been divided into two subgroups: early mediators and late mediators. Early mediators, such as e.g., tumor-necrosis factor, interleukin-1, interleukin-6, are not sufficient therapeutic targets for re-establishing homeostatic balance because they are resolved within the time frame of a patient's travel to a clinic to receive medical attention. In contrast, the so-called "late mediators" have been targeted because it is during this later "inflammatory cascade" that the patient realizes that he or she has fallen ill.

Infectious diseases commonly associated with a "cytokine storm" include but at not limited to, malaria, avian influenza, smallpox, pandemic influenza, adult respiratory distress syndrome (ARDS), a severe acute respiratory syndrome (SARS). Certain specific infectious agents include but are not limited to: infectious diseases is selected from at least one of Ebola, Marburg, Crimean-Congo hemorrhagic fever (CCHF), South American hemorrhagic fever, dengue, yellow fever, Rift Valley fever, Omsk hemorrhagic fever virus, Kyasanur Forest, Junin, Machupo, Sabii, Guanarito, Garissa, Ilesha, or Lassa fever viruses.

Disease conditions commonly associated with a "cytokine storm" include but are not limited to: sepsis, systemic inflammatory response syndrome (SIRS), cachexia, septic shock syndrome, traumatic brain injury (e.g., cerebral cytokine storm), graft versus host disease (GVHD), or the result of treatment with immune therapy, e.g., activated immune cells, IL-2 activated T cells, T cells activated with anti-CD19 Chimeric Antigen Receptor (CAR) T cells.

Generally, a cytokine storm is a healthy systemic expression of a vigorous immune system. The present invention can, inter alia, be used to treat, prevent, inhibit, reduce or eliminate some or most of an exaggerated immune response caused by, e.g., rapidly proliferating and highly activated T-cells or natural killer (NK) cells that results in the release of the "cytokine storm" that can include more than 150 inflammatory mediators (cytokines, oxygen free radicals, and coagulation factors). Both pro-inflammatory cytokines (such as Tumor Necrosis Factor-α, Interleukin-1, and Interkeukin-6) and anti-inflammatory cytokines (such as Interleukin-10, and Interleukin-1 receptor antagonist (IL-1RA)) become greatly elevated in, e.g., serum, before or during a cytokine storm. It is this excessive release of inflammatory mediators that triggers the "cytokine storm."

In the absence of prompt intervention, such as that provided by the present invention, a cytokine storm can result in permanent lung damage and, in many cases, death. The end stage symptoms of the cytokine storm include but are not limited to: hypotension; tachycardia; dyspnea; fever; ischemia or insufficient tissue perfusion; uncontrollable hemorrhage; severe metabolism dysregulation; and multisystem organ failure. Deaths from infectious diseases such as Ebola virus infection are not caused by the virus itself, but rather, the cytokine storm that causes uncontrollable hemorrhaging; severe metabolism dysregulation; hypotension; tachycardia; dyspnea; fever; ischemia or insufficient tissue perfusion; and multisystem organ failure.

As used herein, the phrase "vulnerable to undesired cytokine release, cytokine release syndrome, or cytokine storm" refers to a subject that has come into contact with, is coming into contact with, or will come into contact with one or more environmental agents, pollutants, chemicals, drugs, foods, diseases, treatment regimens, disorders, and conditions that induce undesired cytokine release, cytokine release syndrome, or cytokine storm in the subject.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the examples described herein.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein. For example, in one aspect, the degree of flexibility can be within about +10% of the numerical value. In another aspect, the degree of flexibility can be within about +5% of the numerical value. In a further aspect, the degree of flexibility can be within about +2%, +1%, or ±0.05%, of the numerical value.

Generally herein, the term "or" includes "and" and "and/or."

As used herein, a plurality of compounds or steps may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

In some aspects, the compounds of the invention may be useful in a free acid form, a free base form, in the form of pharmaceutically acceptable salts, pharmaceutically acceptable hydrates, pharmaceutically acceptable esters, pharmaceutically acceptable solvates, pharmaceutically acceptable prodrugs, pharmaceutically acceptable metabolites, and in the form of pharmaceutically acceptable stereoisomers. These forms are all within the scope of the invention. In practice, the use of these forms amounts to use of the neutral compound.

"Pharmaceutically acceptable salt", "hydrate", "ester" or "solvate" refers to a salt, hydrate, ester, or solvate of the inventive compounds which possesses the desired pharmacological activity and which is neither biologically nor otherwise undesirable. Organic acids can be used to produce salts, hydrates, esters, or solvates such as acetate, adipate, alginate, aspartate, benzoate, benzenesulfonate, p-toluenesulfonate, bisulfate, sulfamate, sulfate, naphthylate, butyrate, citrate, camphorate, camphorsulfonate, cyclopentanepropionate, digluconate, dodecylsulfate, ethanesulfonate, fumarate, glucoheptanoate, glycerophosphate, hemisulfate heptanoate, hexanoate, 2-hydroxyethanesulfonate, lactate, maleate, methanesulfonate, 2-naphthalenesulfonate, nicotinate, oxalate, tosylate and undecanoate. Inorganic acids can be used to produce salts, hydrates, esters, or solvates such as hydrochloride, hydrobromide, hydroiodide, and thiocyanate. Other pharmaceutically acceptable salts include, but are not limited to, hydrochloride, hydrobromide, sulphate, phosphate, tartrate, fumarate, maleate, oxalate, acetate, propionate, succinate, mandelate, mesylate, besylate and tosylate.

Salts, hydrates, esters, or solvates may also be formed with organic bases. Pharmaceutically acceptable base addition salts of acidic compounds may be formed with organic and inorganic bases by conventional methods. For example, alkali metal and alkaline earth metal hydroxides, carbonates and bicarbonates such as sodium hydroxide, potassium hydroxide, calcium hydroxide, potassium carbonate, sodium bicarbonate, magnesium carbonate and the like, ammonia, primary, secondary and tertiary amines and the like. Also aluminum salts of the instant compounds may be obtained by treating the corresponding sodium salt with an appropriate aluminum complex such as, for example, aluminum chloride hexahydrate, and the like. Non-toxic organic bases include, but are not limited to, triethylamine, butylamine, piperazine, and tri(hydroxymethyl)-methylamine. Examples of suitable base salts, hydrates, esters, or solvates include hydroxides, carbonates, and bicarbonates of ammonia, alkali metal salts such as sodium, lithium and potassium salts, alkaline earth metal salts such as calcium and magnesium salts, aluminum salts, and zinc salts. Organic bases suitable for the formation of pharmaceutically acceptable base addition salts, hydrates, esters, or solvates of the compounds of the present invention include those that are non-toxic and strong enough to form such salts, hydrates, esters, or solvates. For purposes of illustration, the class of such organic bases may include mono-, di-, and trialkylamines, such as methylamine, dimethylamine, triethylamine and dicyclohexylamine; mono-, di- or trihydroxyalkylamines, such as mono-, di-, and triethanolamine; amino acids, such as arginine and lysine; guanidine; N-methyl-glucosamine; N-methyl-glucamine; L-glutamine; N-methyl-piperazine; morpholine; ethylenediamine; N-benzyl-phenethylamine; (trihydroxy-methyl)aminoethane; and the like. See, for example, "Pharmaceutical Salts," *J. Pharm. Sci.,* 66:1, 1-19 (1977). Accordingly, basic nitrogen-containing groups can be quaternized with agents including: lower alkyl halides such as methyl, ethyl, propyl, and butyl chlorides, bromides and iodides; dialkyl sulfates such as dimethyl, diethyl, dibutyl and diamyl sulfates; long chain halides such as decyl, lauryl, myristyl and stearyl chlorides, bromides and iodides; and aralkyl halides such as benzyl and phenylethyl bromides.

The salts, hydrates, esters, or solvates of the basic compounds may be prepared either by dissolving the free base of a oxathiazin-like compound in an aqueous or an, aqueous alcohol solution or other suitable solvent containing the appropriate acid or base, and isolating the salt by evaporating the solution. Alternatively, the free base of the oxathiazin-like compound may be reacted with an acid, as well as reacting the oxathiazin-like compound having an acid group thereon with a base, such that the reactions are in an organic solvent, in which case the salt separates directly or can be obtained by concentrating the solution.

"Pharmaceutically acceptable prodrug" refers to a derivative of the inventive compounds which undergoes biotransformation prior to exhibiting its pharmacological effect(s). The prodrug is formulated with the objective(s) of improved chemical stability, improved patient acceptance and compliance, improved bioavailability, prolonged duration of action, improved organ selectivity, improved formulation (e.g., increased hydrosolubility), and/or decreased side effects (e.g., toxicity). The prodrug can be readily prepared from the inventive compounds using methods known in the art, such as those described by *Burger's Medicinal Chemistry and Drug Chemistry,* Fifth Ed., Vol. 1, pp. 172-178, 949-982 (1995). For example, the inventive compounds can be transformed into prodrugs by converting one or more of the hydroxy or carboxy groups into esters. Further, N-protected versions of the inventive compounds are also included as non-limiting examples of pharmaceutically acceptable prodrugs of the inventive compounds.

"Pharmaceutically acceptable metabolite" refers to drugs that have undergone a metabolic transformation. After entry into the body, most drugs are substrates for chemical reactions that may change their physical properties and biologic effects. These metabolic conversions, which usually affect the polarity of the compound, alter the way in which drugs are distributed in and excreted from the body. However, in some cases, metabolism of a drug is required for therapeutic effect. For example, anticancer drugs of the antimetabolite class must be converted to their active forms after they have been transported into a cancer cell. Since must drugs undergo metabolic transformation of some kind, the biochemical reactions that play a role in drug metabolism may be numerous and diverse. The main site of drug metabolism is the liver, although other tissues may also participate.

Furthermore, certain compositions, concentrations, dosage regimens, dosage amounts, syndromes or conditions, steps, or the like may be discussed in the context of one specific aspect. It is understood that this is merely for convenience, and such disclosure is equally applicable to other aspects found herein. For example, a list of method steps, active agents, kits or compositions described with respect to a method of treating CRS or cytokine storm would find direct support for aspects related to method steps, active agents, kits or compositions of, e.g., the following: inhibiting or reducing neurotoxicity; decreasing or inhibiting cytokine production; treating one or more symptoms or adverse reactions triggered by an infectious disease or a disease condition that trigger a widespread release of cytokines; inhibiting, preventing or treating vascular leakage, activation of the complement and coagulation cascade inducing disseminated intravascular coagulation (DIC), cardiomyopathy, and/or myocardial dysfunction in a subject at risk thereof; and/or increasing the maximum tolerable dose of a T cell-engaging immunotherapeutic drug, even if those method steps, active agents, kits or compositions are not re-listed in the context of that aspect in the specification.

The term "treating" or "treatment" as used herein and as is well understood in the art, means an approach for obtaining beneficial or desired results, including clinical results. Beneficial or desired clinical results can include, but are not limited to, alleviation or amelioration of one or more symptoms or conditions, diminishment of extent of disease, stabilizing (i.e. not worsening) the state of disease, delaying or slowing of disease progression, amelioration or palliation of the disease state, diminishment of the reoccurrence of disease, and remission (whether partial or total), whether detectable or undetectable. "Treating" and "treatment" can also mean prolonging survival as compared to expected survival if not receiving treatment. In addition to being useful as methods of treatment, the methods described herein may be useful for the prevention or prophylaxis of disease. As used herein, the term "treating" refers to any administration of a compound of the present invention and includes: (i) preventing or inhibiting the disease in a mammal, e.g., a human, that is experiencing or displaying the pathology or symptomatology of the diseased (i.e., arresting further development of the pathology and/or symptomatology); or (ii) ameliorating the disease in a mammal, e.g., a human that is experiencing or displaying the pathology or symptomatology of the disease (i.e., reversing the pathology and/or symptomatology). The term "controlling" includes preventing, treating, eradicating, ameliorating or otherwise reducing the severity of the condition being controlled.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 0.01 to 2.0" should be interpreted to include not only the explicitly recited values of about 0.01 to about 2.0, but also include individual values and sub-ranges within the indicated range. Thus, included in this numerical range are individual values such as 0.5, 0.7, and 1.5, and sub-ranges such as from 0.5 to 1.7, 0.7 to 1.5, and from 1.0 to 1.5, etc. Furthermore, such an interpretation should apply regardless of the breadth of the range or the characteristics being described. Additionally, it is noted that all percentages are in weight, unless specified otherwise.

In understanding the scope of the present disclosure, the terms "including" or "comprising" and their derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps. It is understood that reference to any one of these transition terms (i.e. "comprising," "consisting," or "consisting essentially") provides direct support for replacement to any of the other transition term not specifically used. For example, amending a term from "comprising" to "consisting essentially of" would find direct support due to this definition.

Some oxathiazin-like compounds are described in PCT/IB2015/059741, filed Dec. 17, 2015, which is incorporated herein by reference in its entirety. In certain aspects, oxathiazin-like compounds according to Formula I are utilized according to the invention wherein R is H, an in vivo cleavable linker or group, or a leaving group in aqueous solution, and $R_1$ and $R_2$ are independently, H, alkyl, an aryl, a substituted alkyl, a substituted phenyl, a substituted aryl, or a combination thereof. In some aspects, R is an in vivo cleavable linker or group. In some aspects, the substitute alkyl, substituted phenyl, or substituted aryl may be substituted with any appropriate molecule including, e.g., one or more halogens or halogen-containing molecules, one or more hydroxyl groups, one or more acyl groups, one or more acyloxy groups, one or more alkoxy groups, one or more aryl groups, one or more carboxy groups, one or more carbonyl groups, one or more alkylcarboxy groups, one or more alkylsufonoxy groups, one or more alkylcarbonyl groups, one or more nitro groups, one or more cyano groups, one or more acylamido groups, one or more phenyl groups, one or more tolyl groups, one or more chlorophenyl groups, one or more alkoxyphenyl groups, one or more halophenyl groups, one or more benzoxazole groups, one or more thiazoline groups, one or more benzimidazole groups, one or more oxazole groups, one or more thiazole groups, one or more indole groups, etc., or a combination thereof. In some aspects, the alkyl or substituted alkyl may be a C1 to C30 alkyl. In some aspects, the alkyl may be branched or unbranched. In some aspects, the aryl may be heterocyclic, polycyclic, or monocyclic.

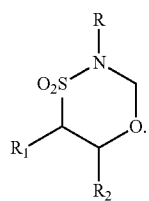

Formula I

Exemplary oxathiazin-like compounds include the following:

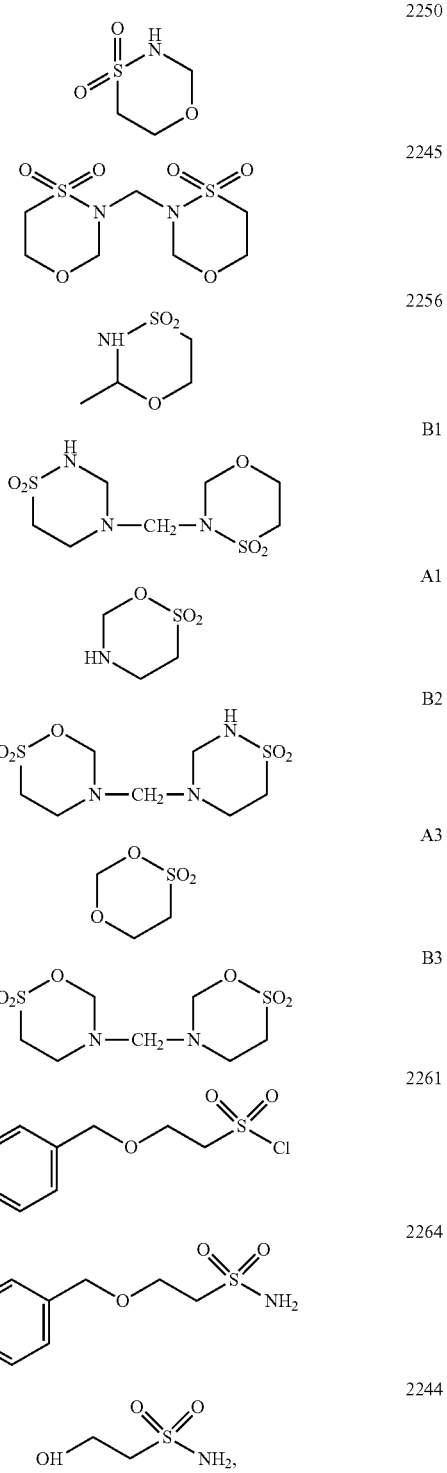

and isethionic acid hydroxymethylamide.

In certain preferred aspects, 2250 (Tetrahydro1,4,5-oxathiazin-4-dioxide or 1,4,5-oxathiazan-4-dioxide) is used for treating, preventing, inhibiting, reducing cytokine release, CRS or cytokine storm in accordance with the disclosure herein.

In certain aspects, the invention also relates to compositions, e.g., pharmaceutical composition containing the compounds described herein, including pharmaceutically acceptable solutions of said compounds, as well as orally administrable compositions such as capsules and tablets containing said compositions.

The terms "effective amount" or "therapeutically effective amount" described herein means the amount of the subject compound that will elicit the biological or medical response of a tissue, system, animal or human that is being sought by the researcher, veterinarian, medical doctor or other clinician. In one example, the therapeutically effective amount comprises about 0.0001 to about 10,000 mg/kg, about 0.001 mg/kg to about 5,000 mg/kg, about 0.01 mg/kg to about 1,000 mg/kg, about 0.05 mg/kg to about 750 mg/kg, about 0.1 mg/kg to about 600 mg/kg, about 1 mg/kg to about 500 mg/kg, about 10 mg/kg to about 400 mg/kg, about 20 mg/kg to about 300 mg/kg, about 200 mg/kg to about 500 mg/kg, about 300 mg/kg to about 400 mg/kg, about 250 mg/kg, 300 mg/kg, 400 mg/kg, 420 mg/kg, 450 mg/kg, about 500 mg/kg, or an dosage amount or range within any of the disclosed ranges of body weight of the subject.

The terms "administration of" or "administering a" compound as used herein should be understood to mean providing a compound of the invention to the individual in need of treatment in a form that can be introduced into that individual's body, e.g., intravenously, subcutaneously, intramuscularly, topically, orally, intraperitoneally, intrathecally, intranasally, intrapulmonary, transdermally, intraocularly, by inhalation, transtracheally, intravitreally, or a combination thereof. In some aspects, a compound of the invention may be administered in a therapeutically useful form and therapeutically useful amount, including, but not limited to: oral dosage forms, such as tablets, capsules, syrups, suspensions, and the like; injectable dosage forms, such as intravenous (IV), intramuscular (IM), or intraperitoneal (IP), intranasal, and the like; enteral or parenteral, transdermal dosage forms, including creams, jellies, powders, or patches; buccal dosage forms; inhalation powders, sprays, suspensions, and the like; and rectal suppositories.

Depending upon the particular route of administration desired a variety of pharmaceutically acceptable carriers well known in the art may be used. These include solid or liquid fillers, diluents, hydrotropes, surface-active agents, and encapsulating substances. Optional pharmaceutically active materials may be included, which do not substantially interfere with the activity of the one or more oxathiazin-like compounds.

As used herein the term "intravenous administration" includes injection, infusion, and other modes of intravenous administration.

The term "pharmaceutically acceptable" as used herein to describe a carrier, diluent or excipient must be compatible with the other ingredients of the formulation and not deleterious to the recipient thereof.

In one aspect, the present disclosure includes preventing, inhibiting or reducing the incidence of cytokine release, cytokine release syndrome (CRS) or a cytokine storm in a subject by administering one or more oxathiazin-like compounds, or a combination thereof. In some aspects, the subject is at risk of undesired cytokine release. In some aspects, the subject is in need of control or down-regulation of cytokine release. In some aspects, the subject has undergone, may be undergoing, or will undergo therapy with an agent or regimen that is expected to result in cytokine release requiring control. In some aspects, the subject has undergone, may be undergoing, or will undergo immunotherapy, T cell-engaging therapies, chimeric antigen receptor-expressing T-cell (CAR T-cell) therapy, and/or or bispecific antibody therapy. In some aspects, the present disclosure provides methods and compositions for treating conditions mediated by the inflammatory cytokine cascade as disclosed in U.S. Pat. No. 8,715,658 (Tracey), which is incorporated herein by reference in its entirety.

In some aspects, conditions mediated by cytokine release additionally include and are not limited to condition selected from the group consisting of appendicitis, peptic, gastric and duodenal ulcers, peritonitis, pancreatitis, ulcerative, pseudomembranous, acute and ischemic colitis, diverticulitis, epiglottitis, achalasia, cholangitis, cholecystitis, hepatitis, Crohn's disease, enteritis, Whipple's disease, asthma, allergy, anaphylactic shock, immune complex disease, organ ischemia, reperfusion injury, organ necrosis, hay fever, sepsis, septicemia, endotoxic shock, cachexia, hyperpyrexia, eosinophilic granuloma, granulomatosis, sarcoidosis, septic abortion, epididymitis, vaginitis, prostatitis, urethritis, bronchitis, emphysema, rhinitis, cystic fibrosis, pneumonitis, alvealitis, bronchiolitis, pharyngitis, pleurisy, sinusitis, a parastic infection, a bacterial infection, a viral infection, an autoimmune disease, influenza, respiratory syncytial virus infection, herpes infection, HIV infection, hepatitis B virus infection, hepatitis C virus infection, disseminated bacteremia, Dengue fever, candidiasis, malaria, filariasis, amebiasis, hydatid cysts, burns, dermatitis, dermatomyositis, sunburn, urticaria, warts, wheals, vasulitis, angiitis, endocarditis, arteritis, atherosclerosis, thrombophlebitis, pericarditis, myocarditis, myocardial ischemia, periarteritis nodosa, rheumatic fever, coeliac disease, congestive heart failure, adult respiratory distress syndrome, a coronavirus, SARS-CoV-2, Middle East Respiratory Syndrome (MERS), a multisystem inflammatory syndrome, a coronavirus-induced inflammatory syndrome, Kawasaki disease, meningitis, encephalitis, cerebral infarction, cerebral embolism, Guillame-Barre syndrome, neuritis, neuralgia, spinal cord injury, paralysis, uveitis, arthritides, arthralgias, osteomyelitis, fasciitis, Paget's disease, gout, periodontal disease, rheumatoid arthritis, synovitis, myasthenia gravis, thryoiditis, systemic lupus erythematosus, Goodpasture's syndrome, Behcets's syndrome, allograft rejection, graft-versus-host disease, ankylosing spondylitis, Berger's disease, Retier's syndrome, and Hodgkins disease.

In one aspect, the present disclosure provides a method for treating a neuromyelitis optica spectrum disorder (NMSOD), which is a rare relapsing autoimmune disease of the central nervous system. IL-6 signaling is implicated in playing a key role in the inflammation that occurs in NMSOD, in particular in triggering relapse. The compounds of the present disclosure inhibit the production of inflammatory cytokines including IL-6 so as to treat patients suffering from or at risk of developing a NMSOD.

In some aspects, the present disclosure includes monitoring the subject for fever as a clinical sign of impending cytokine release, CRS or cytokine storm in patients at risk of undesired cytokine release or in need of control or down-regulation of cytokine release and administering one or more oxathiazin-like compounds of the present disclosure within about 24 hours, e.g., within about 1, 2, 3, 4, 5, 6, 8, 10, or 12 hours of the onset of fever. For example, the patient may be receiving immunotherapy or one or more T cell-engaging therapies.

In some aspects, the present disclosure includes monitoring the subject for one or more biomarkers indicative of impending cytokine release, CRS or cytokine storm in patients receiving T cell-engaging therapies and administering one or more oxathiazin-like compounds of the present disclosure within about 24 hours, e.g., within about 1, 2, 3, 4, 5, 6, 8, 10, or 12 hours of detection of the one or more biomarkers. In some aspects, serum, blood or tissue levels of one or more of IL-1β, IL-1RA, IL-2, IL-4, IL-6, IL-8, IL-10, IL-12, IP-10, IFN-α, IFN-γ, G-CSF, and TNF-α of the subject receiving T cell-engaging therapies are monitored and one or more oxathiazin-like compounds of the present disclosure are administered within about 6 hours, e.g., within about 0.5, 1, 2, 3, 4, 5, 6 hours of detection of an increase in the serum, blood or tissue levels of one or more of IL-1β, IL-1RA, IL-2, IL-4, IL-6, IL-8, IL-10, IL-12, IP-10, IFN-α, IFN-γ, G-CSF, and TNF-α above a threshold level or percentage above a baseline. In some aspects, CD4+ and CD8+ T cell levels and ratios of the subject are monitored and one or more oxathiazin-like compounds of the present disclosure are administered within about 6 hours, e.g., within about 0.5, 1, 2, 3, 4, 5, 6 hours of detection of an increase in the serum, blood or tissue levels of one or more of CD4+ or CD4/CD8 ratio above a threshold level or percentage above a baseline.

In some aspects, the present disclosure includes monitoring the subject using a PBMC assay. In some aspects, the present disclosure includes monitoring the subject using a whole blood (WB) assay.

In one aspect, the present disclosure includes preventing, inhibiting or reducing cytokine release including, but not limited to release of IL-1β, IL-1RA, IL-2Rα, IL-2, IL-4, IL-6, IL-8, IL-10, IL-12, IL-17, IL-18, IP-10, IFN-α, IFN-γ, MCP-3, MCP-1, M-CSF, G-CSF, MIP-la, TNF-α, CCL5, CXCL8, CXCL1, CXCL2, CXCL10, CCL2, CCL7, CXCL6, CXCL11, CCL2, CCL3, CCL4, CCL7, CCL8, and CCL20 in subjects before, during or after the onset of cytokine release, e.g., before, during or after treatment with, e.g., immunotherapeutics, e.g., T-cell engaging therapeutics.

In another aspect, the methods and compositions of the present disclosure surprisingly do not reduce the killing of targeted cancer cells by such immunotherapeutics. Prior to the present disclosure, known agents used to shut down cytokines did so at the expense of reducing the targeted cancer cell cytotoxicity. In contrast, and as exemplified in Example 3, the compositions and methods of the present disclosure were surprisingly found to not reduce the killing of targeted cancer cells by such immunotherapeutics.

In one aspect, the present disclosure includes inhibiting, reducing or preventing release of IFN-γ. Secreted IFN-γ induces activation of other immune cells, most importantly macrophages. The activated macrophages produce excessive amounts of additional cytokines such as IL-6, TNF-α, and IL-10. TNF-α elicits flu-like symptoms similar to IFN-γ with fever, general malaise, and fatigue but furthermore is responsible for watery diarrhea, vascular leakage, cardiomyopathy, lung injury, and the synthesis of acute phase proteins. Various therapeutic drugs including anti-cancer therapies and interferon drugs are known in the art to induce flu-like symptoms in patients. The present disclosure includes treating, inhibiting, reducing or preventing drug-induced flu-like symptoms in a subject at risk thereof by administering one or more oxathiazin-like compounds to a subject.

IL-6 contributes to many of the key symptoms of CRS and cytokine storm. Via trans-signaling, IL-6 leads to characteristic symptoms of severe CRS and cytokine storm, i.e., vascular leakage, and activation of the complement and coagulation cascade inducing disseminated intravascular coagulation (DIC). In addition, IL-6 likely contributes to cardiomyopathy that is often observed in patients with CRS and cytokine storm by promoting myocardial dysfunction. The present disclosure includes inhibiting, preventing, reducing or treating vascular leakage, activation of the complement and coagulation cascade inducing disseminated intravascular coagulation (DIC), cardiomyopathy, and/or myocardial dysfunction in a subject at risk thereof by administering one or more oxathiazin-like compounds to a subject in need thereof. Inflammatory signals such as LPS trigger the release of inflammatory cytokines by activating the transcription factor NFkB (NF kappa B). Upon activation, NFkB migrates from the cytoplasm to the nucleus and activates the expression of a broad set of genes including those for the production of chemokines and inflammatory cytokines such as IL-1β, IL-6, TNFα, INFγ. The inhibition of the production and release of chemokines and inflammatory cytokines by oxathiazin-like compounds of the present disclosure indicates that oxathiazin-like compounds of the present disclosure are inhibitors of the NFkB pathway. In some aspects, oxathiazin-like compounds of the present disclosure may directly or indirectly inhibit NFkB.

In one aspect, the patient is treated with one or more oxathiazin-like compounds, or a combination thereof, administered intravenously, orally or a combination thereof. In one aspect, the patient is treated with 2250 (also referred to as "compound 2250" or "C-2250") administered intravenously, orally or a combination thereof. In one aspect, the administration of the composition occurs prior to, concurrent with, or following therapy, e.g., immunotherapy, T cell engaging therapy, CAR T-cell therapy and antibody therapy, e.g., monoclonal antibody therapy) and/or bispecific antibody therapy.

In one aspect, the patient is administered one or more oxathiazin-like compounds or a combination thereof in combination therapy with one or more anti-neoplastic drugs such as nucleoside analogues, antifolates, antimetabolites, topoisomerase I inhibitors, anthracyclines, podophyllotoxins, taxanes, *vinca* alkaloids, alkylating agents, platinum compounds, antibodies, tyrosine kinase inhibitors, mTOR inhibitors, retinoids, immunomodulatory agents, histone deacetylase inhibitors, plant alkaloids, and antitumor antibiotics. For example, the patient may be administered one or more oxathiazin-like compounds or a combination thereof in combination with non-protein-based cancer drugs such as oxaliplatin and lenalidomide. In one aspect, the patient is administered one or more oxathiazin-like compounds or a combination thereof in combination with antibody-based therapies such as anti-thymocyte globulin (ATG), the CD28 superagonist TGN1412, rituximab, obinutuzumab, alemtuzumab, brentuximab, dacetuzumab, and nivolumab. In one aspect, the patient is administered one or more oxathiazin-like compounds or a combination thereof in combination with immunotherapies such as T-cell engaging therapy and antibodies.

In one aspect, the patient is administered one or more oxathiazin-like compounds or a combination thereof in combination with donor stem cell transplantation.

In one aspect, the patient is administered one or more oxathiazin-like compounds or a combination thereof in combination with an interferon-containing drug product, e.g., interferon alpha, interferon beta, or interferon gamma, or an interleukin-containing drug product.

In one aspect, the patient is administered one or more oxathiazin-like compounds or a combination thereof in combination with an erythropoietin, a granulocyte colony-stimulating factor, or a bone morphogenetic protein.

In some aspects, the present disclosure includes administering one or more oxathiazin-like compounds in combination with one or more of tocilizumab, antihistamines, antipyretics, anti-inflammatory compounds, corticosteroids, glucocorticoids, TNF-inhibitors (e.g., etanercept), siltuximab, T cell-depleting antibody therapies such as alemtuzumab and antithymocyte globulins (ATG), IL-1R-based inhibitors (anakinra), ibrutinib and cyclophosphamide.

The compounds of this disclosure, particularly compound 2250, have been found to be very soluble in water. In certain aspects, no polyvinylpyrrolidone (PVP) is necessary to increase the solubility. For example, a 3.2% solution 2250 is isotonic.

Compounds according to the invention can be administered by any suitable method. Solid dosage forms for oral administration include capsules, tablets, pills, powders, and granules. In such solid dosage forms, the provided composition is mixed with at least one inert, pharmaceutically acceptable excipient and/or fillers or extenders (e.g., starches, lactose, sucrose, glucose, mannitol, and silicic acid), binders (e.g., carboxymethylcellulose, alginates, gelatin, polyvinylpyrrolidinone, sucrose, and acacia), humectants (e.g., glycerol), disintegrating agents (e.g., agar, calcium carbonate, potato starch, tapioca starch, alginic acid, certain silicates, and sodium carbonate), solution retarding agents (e.g., paraffin), absorption accelerators (e.g., quaternary ammonium compounds), wetting agents (e.g., cetyl alcohol and glycerol monostearate), absorbents (e.g., kaolin and bentonite clay), and lubricants (e.g., talc, calcium stearate, magnesium stearate, solid polyethylene glycols, sodium lauryl sulfate), and mixtures thereof. In the case of capsules, tablets and pills, the dosage form may comprise buffering agents.

Solid compositions of a similar type may be employed as fillers in soft and/or hard-filled gelatin capsules using such excipients as lactose or milk sugar as well as high molecular weight polyethylene glycols and the like. The solid dosage forms of tablets, dragees, capsules, pills, and granules can be prepared with coatings and shells such as enteric coatings and other coatings well known in the pharmaceutical formulating art. They may optionally comprise opacifying agents and can be of a composition that they release the provided composition(s) only in, or targeting, a certain part of the intestinal tract, optionally, in a delayed manner. Examples of embedding compositions which can be used include polymeric substances and waxes. Solid compositions of a similar type may be employed as fillers in soft and hard-filled gelatin capsules using such excipients as lactose or milk sugar as well as high molecular weight polyethylene glycols and the like.

In certain aspects, capsules may contain an excipient formulation containing one or more of hydroxypropyl methylcellulose (HPMC), gelatin, and fish gelatin. In certain aspects, a capsule may contain compound 2250 in combination with taurolidine and/or taurultam. The capsule may optionally further contain one or more of lycopene, ellagic acid (polyphenol), curcumin, piperine, delphinidin, resveratrol, isothiocyanates such as sulforaphane, capsaicin, and piperlongumine.

When used in the form of microparticles or nanoparticles, the compounds of the claimed invention may achieve higher blood levels. The present invention includes microparticles and/or nanoparticles of the compounds of the present disclosure in tablet form or encapsulated in capsules.

In certain aspects, this disclosure relates to administering an oxathiazin-like compound orally to a patient. In some aspects, an oxathiazin-like compound is formulated in capsules or tablets. In certain aspects, oral dosage forms contain between about 50-1000 mg of an oxathiazin-like compound. In certain aspects, oral dosage forms contain between about 100-500 mg of an oxathiazin-like compound. In certain aspects, oral dosage forms contain between about 200-400 mg of an oxathiazin-like compound. In certain aspects, oral dosage forms contain between about 250-350 mg of an oxathiazin-like compound. In certain aspects, the oxathiazin-like compound is C-2250.

In some aspects, the oxathiazin-like compound is provided in a composition at a concentration of about 0.01 to about 500 µg/ml. In some aspects, the oxathiazin-like compound is provided in a composition at a concentration of about 0.1 to about 100 µg/ml. In some aspects, the oxathiazin-like compound is provided in a composition at a concentration of about 10 to about 50 g/ml.

In some aspects, the oxathiazin-like compound is provided in a composition at a concentration of about 0.001 to about 5 wt. %, about 0.01 to about 3.5 wt. %, about 0.1 to about 3 wt. %, about 0.5 to about 2.5 wt. %, or about 1 to about 2 wt. %. In some aspects, the oxathiazin-like compound is provided in a composition at a concentration of about 0.01 to about 1.5%. In some aspects, the oxathiazin-like compound is provided in a composition at a concentration of about 0.1% to about 1%. In some aspects, the oxathiazin-like compound is provided in a composition at a concentration of about 100 to about 5000 µM, about 250 to about 2500 µM, about 500 to about 2000 µM, about 750 to about 1500 µM, about 1000 to about 1250 µM, or any other concentration within the recited ranges.

In some aspects, the oxathiazin-like compound is provided in a composition in a unit dosage form. As used herein, a "unit dosage form" is a composition containing an amount of oxathiazin-like compound that is suitable for administration to an animal, such as a mammal, e.g., a human subject, in a single dose, according to a good medical practice. These compositions may contain from about 0.1 mg (milligrams) to about 500 mg, for example from about 5 mg to about 350 mg of oxathiazin-like compound. The frequency of treatment with the composition of the invention may be changed to achieve and maintain the desired target plasma level. Thus, non-limiting examples of treatment schedules include daily, twice daily, three times daily, weekly, biweekly, monthly, and combinations thereof. Alternatively, the composition of the invention may also be administered as a continuous infusion.

In certain aspects, one or more oxathiazin-like compounds of the present disclosure are administered to a subject prior to administration of a therapeutic that is expected to lead to cytokine release in the subject. For example, in one aspect, the one or more oxathiazin-like compounds of the present disclosure are administered about 12 to 96, e.g., 24, 48 or 72, hours prior to administration of a therapeutic that is expected to lead to cytokine release in the subject. In one aspect, the one or more oxathiazin-like compounds of the present disclosure are administered in one or multiple doses prior to administration of a therapeutic that is expected to lead to cytokine release in the subject. In certain aspects, one or more oxathiazin-like compounds of the present disclosure are administered to a subject concurrently with a therapeutic that is expected to lead to cytokine release in the subject. In certain aspects, the oxathiazin-like compound is administered to the subject within about 1 to about 24 hours, about 2 to about 18 hours, about 6 to about 15 hours, about 4 to about 12 hours, or any range of time in the disclosed ranges after administration to the subject of a therapeutic that is expected to lead to cytokine release in the subject.

In certain aspects, one or more oxathiazin-like compounds of the present disclosure are administered according to a regimen during a period when CRS or cytokine storm is expected to occur. For example, in one aspect, the one or more oxathiazin-like compounds of the present disclosure are administered daily, every other day, biweekly, or weekly for a 3 to 10 week period, a 4 to 8 week period, or a 4 to 6 week period, before, during, and/or after administration of a therapeutic that is expected to lead to cytokine release in the subject, e.g., a T-cell engaging therapy.

In certain aspects, it is advantageous to administer one or more oxathiazin-like compounds of the present disclosure prophylactically prior to initiation of the therapy. For example, CRS or cytokine storm from bispecific antibody therapy is often observed within minutes to hours of administration of the bispecific antibody and thus it is particularly advantageous to administer the cytokine release-inhibiting compounds of the present disclosure prior to administration of the bispecific antibody therapy.

In one aspect, the oxathiazin-like compound is provided in a composition and is administered to a subject in need thereof at a total daily dosage may be about 0.001 g to about 1000 g, e.g., about 0.01 g to about 500 g, 0.1 to 300 g, 0.5 to 200 g, 1 g to 100 g, or any amount within the recited range. The daily dosage may be administered in the form of an orally administrable composition. The daily dosage may be administered in the form of a capsule, a tablet, or a pharmaceutically acceptable solution. The daily dosage may be administered in a form that contains compounds of the present disclosure, e.g., 2250, at a concentration of about 0.01 to about 3% w/v.

The daily dosage may be administered in a form that contains compound 2250 at a concentration of about 0.01 µg/ml to about 1000 µg/ml. The daily dosage may be administered in a form that contains one or more solubilizing agents, e.g., polyols.

Effective dosage amounts of the oxathiazin-like compound are provided in a composition may include dosage units containing about 0.01-500 mg/kg, about 1-100 mg/kg per day, or about 5-50 mg/kg per day of the oxathiazin-like compound. In some aspects, dosage units are administered every other day, biweekly, or weekly.

The specific effective dose for any particular patient will depend on a variety of factors including the severity or likelihood of the cytokine release, cytokine release syndrome (CRS) or cytokine storm; activity of the specific compound employed; the age, body weight, general health, sex and diet of the patient; the preparation of the specific compound; the time and route of administration; the duration of administration; therapeutic agents used in combination or coinciding with the specific compound employed; and like factors known in the medical arts. The effective dose may also change over time as the cytokine release syndromes or storms worsen or improve. For chronic conditions, subjects may receive effective doses for a plurality of days, weeks, or months. The number of and frequency of administrations or co-administrations may vary depending upon the likelihood or severity of the cytokine release, CRS and cytokine storm, and the patient specific response to the particular compound administered and/or the second therapeutically active agent administered.

EXAMPLES

Aspects of the present disclosure will be further described with reference to the following Examples, which are provided for illustrative purposes only and should not be used to limit the scope of or construe the invention.

Example 1

The ability of C-2250 to suppress in vitro cytokine release from primary human peripheral blood mononuclear cells (PBMCs) was assessed. Lipopolysaccharide (LPS) inhibition by C-2250 was determined. PBMCs from five individual, normal healthy human volunteers were incubated with C-2250, followed by LPS stimulation for 48 hours. Detection of three different cytokines was performed using an antibody capture bead-based kit and flow cytometric analysis.

Cryopreserved PBMCs from five healthy human donors (IQ Biosciences, Catalog #I QB-PBMC103) were thawed and cultured in RPMI 1640 medium (Gibco RPMI-1640 Medium (ATCC, Catalog #30-2001) supplemented with 10% FCS, 2 mM L-glutamine, 100 IU/mL penicillin, 100 µg/mL streptomycin, 1 mM sodium pyruvate (all from ThermoFisher) with viability >85% as determined automated cell counter (Countess II FL Automated Cell Counter; ThermoFisher; Catalog #AMQAF1000) prior to experiments. For C-2250, a 73 mM stock was prepared in sterile Lactated Ringer's Solution less than two hours prior to the start of the assay by adding 100 mg C-2250 into 10 mL Lactated Ringer's Solution. Prior to use in the assay, the pH of the solution was adjusted to 7.3. 100 µl of PBMCs at $1.0 \times 10^7$ cells/mL were washed and re-suspended in tissue culture medium containing a fixed concentration (1 ng/ml) of LPS from E. coli, serotype 0111:B4. LPS stimulation was performed for 48 hours at 37° C., 5% $CO_2$ prior to harvesting tissue culture supernatant for cytokine analysis. C-2250 was used at 500, 1000, and 1500 µM concentrations.

The donor demographics were as follows:

|  | PBMC Donor ID | | | | |
| --- | --- | --- | --- | --- | --- |
|  | 0887 | 3661 | 3729 | 4143 | 4238 |
| Age | 47 | 45 | 45 | 38 | 29 |
| Sex | Male | Male | Male | Female | Male |
| Ethnicity | Caucasian | Caucasian | Caucasian | Caucasian | Caucasian |
| Weight | 78 kg | 101 kg | 81 kg | 104 kg | 98 kg |
| Smoker | No | No | No | Yes | No |
| Presumptive Blood Type | A+ | O+ | A+ | O+ | A- |
| HIV/HBV/HCV | Negative | Negative | Negative | Negative | Negative |
| CD3 T cells | 24.0 | 54.6 | 58.9 | 76.6 | 57.4 |
| CD4+ T Cells (Gated on CD3+) | 76.0 | 79.0 | 80.1 | 73.7 | 63.9 |
| CD8+ T Cells (Gated on CD3+) | 24.0 | 26.6 | 31.9 | 26.3 | 36.1 |
| CD19+ B Cells | 50.0 | 8.9 | 5.1 | 11.0 | 15.1 |
| CD14+ Monocytes Cells | 15.6 | 30.5 | 34.2 | 38.1 | 13.7 |
| CD56 NK cells | 6.9 | 7.6 | 3.6 | 9.1 | 28.2 |

Figure 1B:
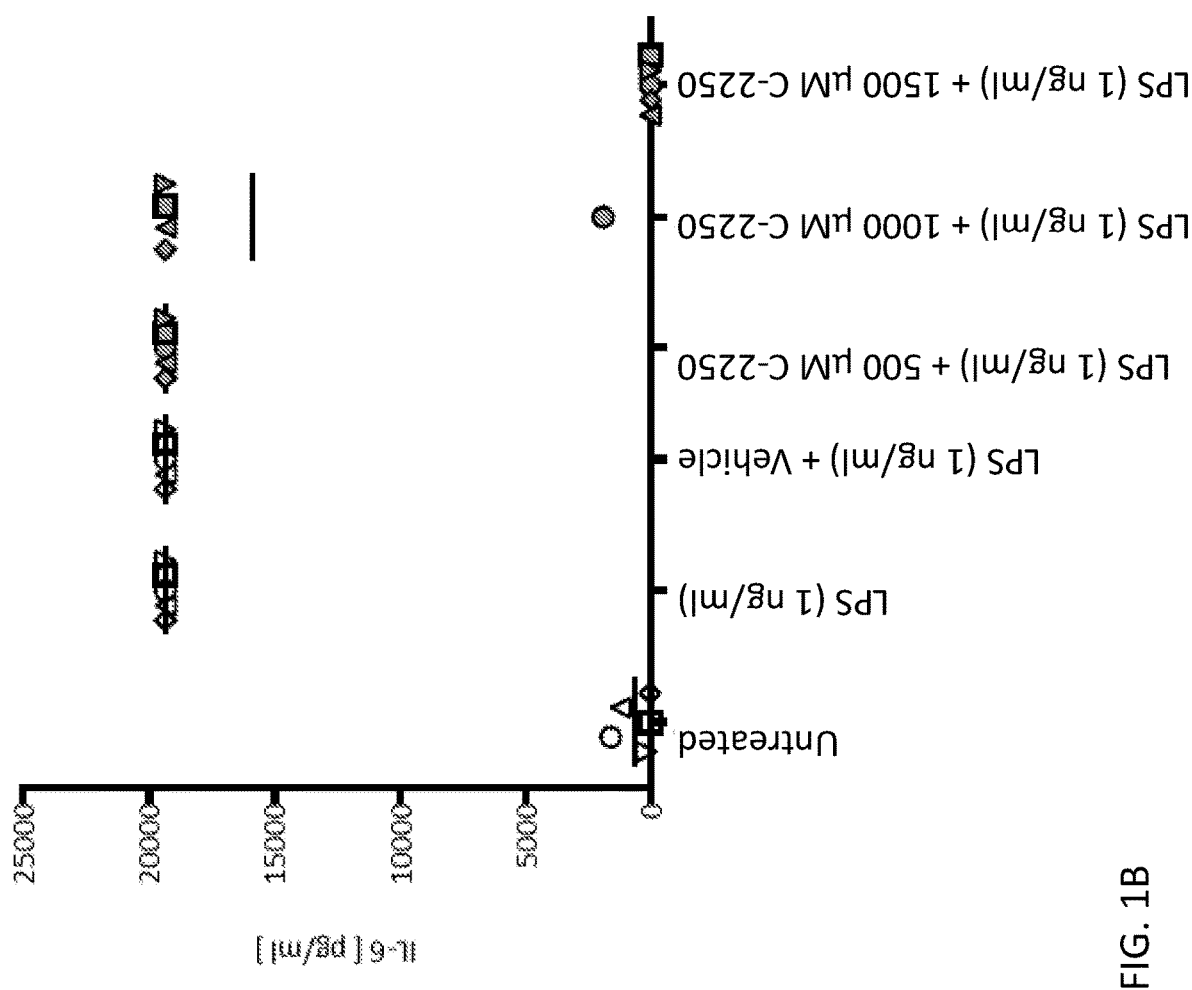
FIG. 1B shows LPS Simulated Human PBMC at 48 hours, IL-6.
Figure 1C:
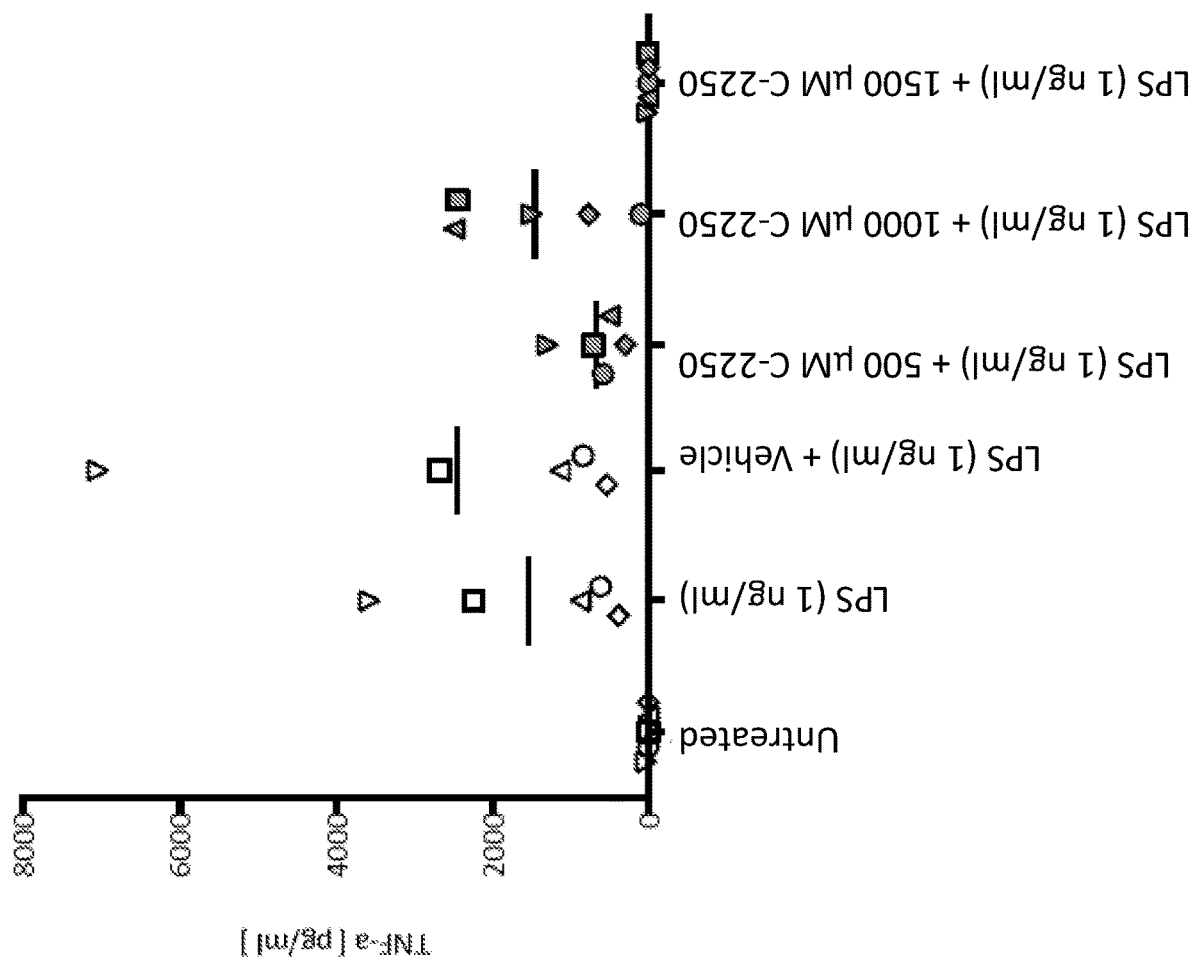
FIG. 1C shows LPS Simulated Human PBMC at 48 hours, TNF-α.

Results for IL-1β, IL-6, and TNF-α are summarized in FIGS. 1A, 1B, and 1C. FIG. 1A shows LPS Simulated Human PBMC at 48 hours, IL-1 (LLD 0.62 pg/ml; ULD 15,228 pg/ml). FIG. 1B shows LPS Simulated Human PBMC at 48 hours, IL-6 (LLD 1.0 pg/ml; ULD 19,360 pg/ml). FIG. 1C shows LPS Simulated Human PBMC at 48 hours, TNF-α (LLD 0.39 pg/ml; ULD 10,000 pg/ml). Each symbol represents the mean value of triplicate analysis of a single donor. Each bar per treatment group represents the mean value of all donors where the triplicate value of each donor is averaged.

All individual donors were responsive to LPS stimulation, producing significant levels of IL-1β, IL-6, and TNF-α across individual donors. C-2250 provided dose-dependent inhibition of IL-1β, IL-6, and TNF-α cytokines.

Example 2

Human CD19 specific CAR-T effector cells from a donor were co-cultured with Raji, a human CD19 expressing target B cell line at different effector to target cell ratios of 5:1, 10:1, and 20:1 in the presence of C-2250. Co-culture was performed for 6 hours or 24 hours at 37° C., 5% $CO_2$ prior to harvesting cells for CAR-T mediated target cell lysis or tissue culture supernatant for cytokine analysis. C-2250 was used at 500, 1000, and 1500 µM concentrations and was allowed to pre-incubate with CAR-T cells prior to addition of tumor target cells.

Figure 2A:
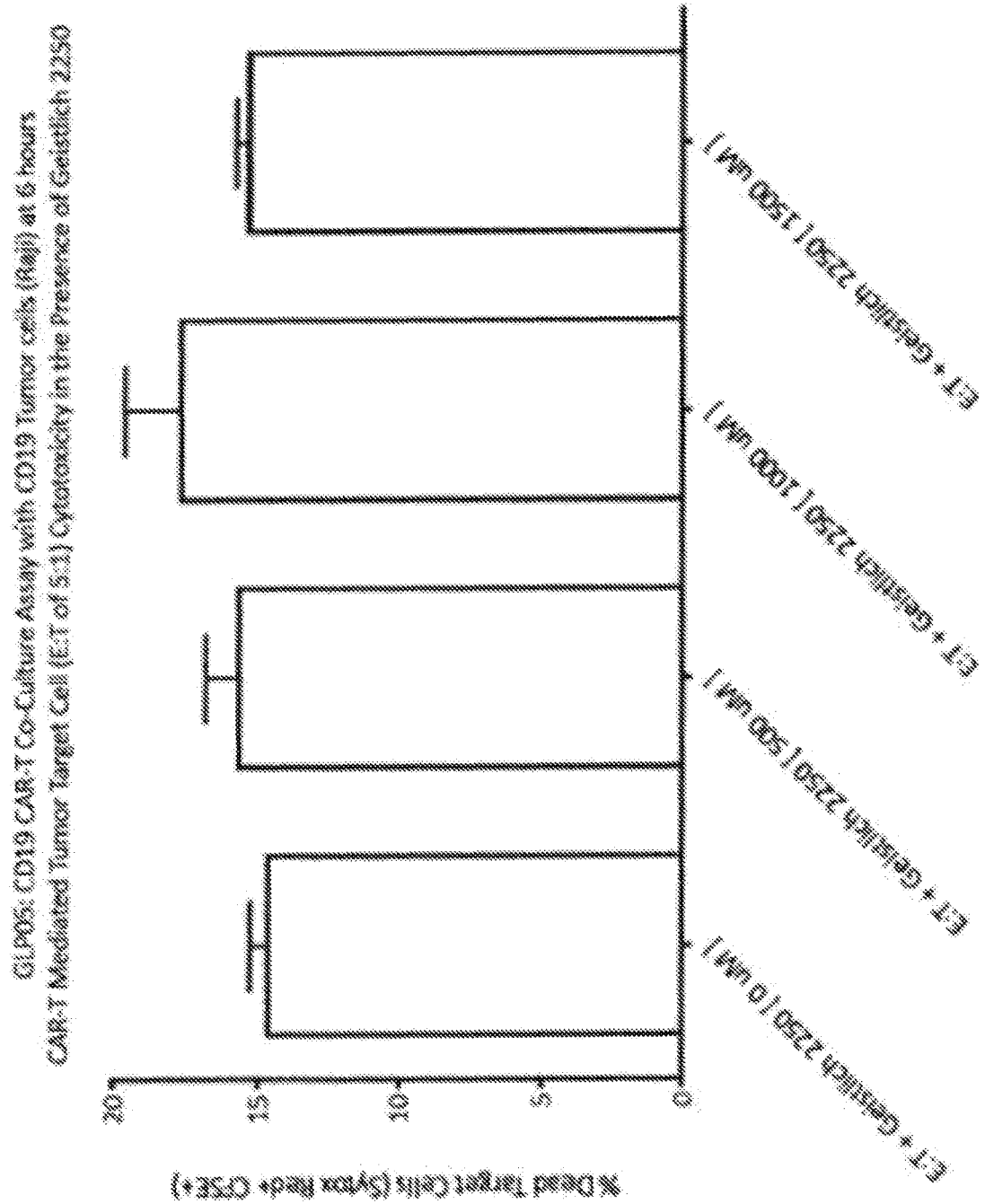
FIGS. 2A-2C show the results of CD19 CAR-T co-culture assay with CD-19 tumor cells (Raji) at 6 hours, CAR-T mediated tumor target cell in the present of increasing concentrations of C-2250 are shown (E:T ratios of 5:1, 10:1, and 20:1 are shown in FIGS. 2A, 2B, and 2C, respectively).
Figure 2B:
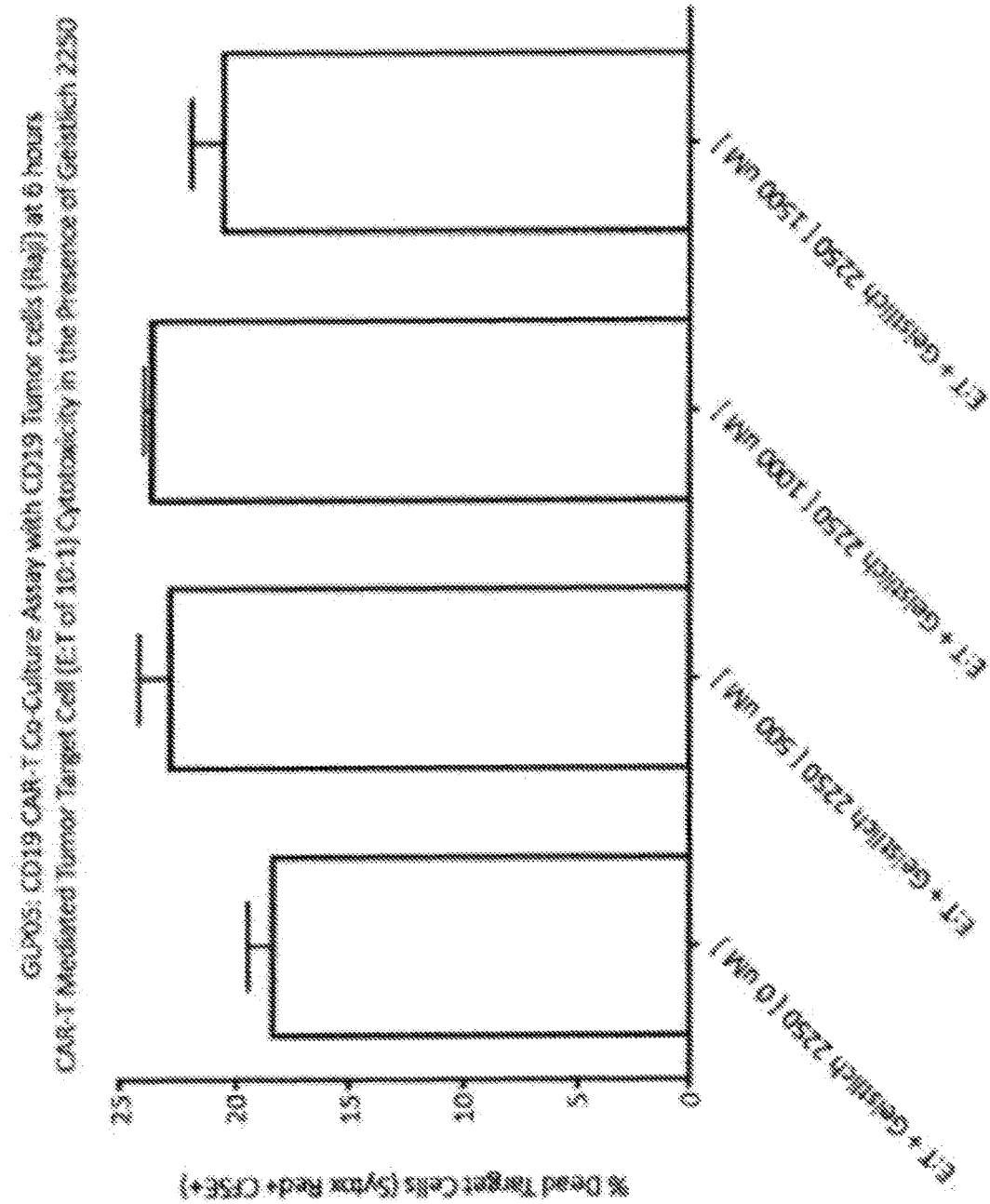
Figure 2C:
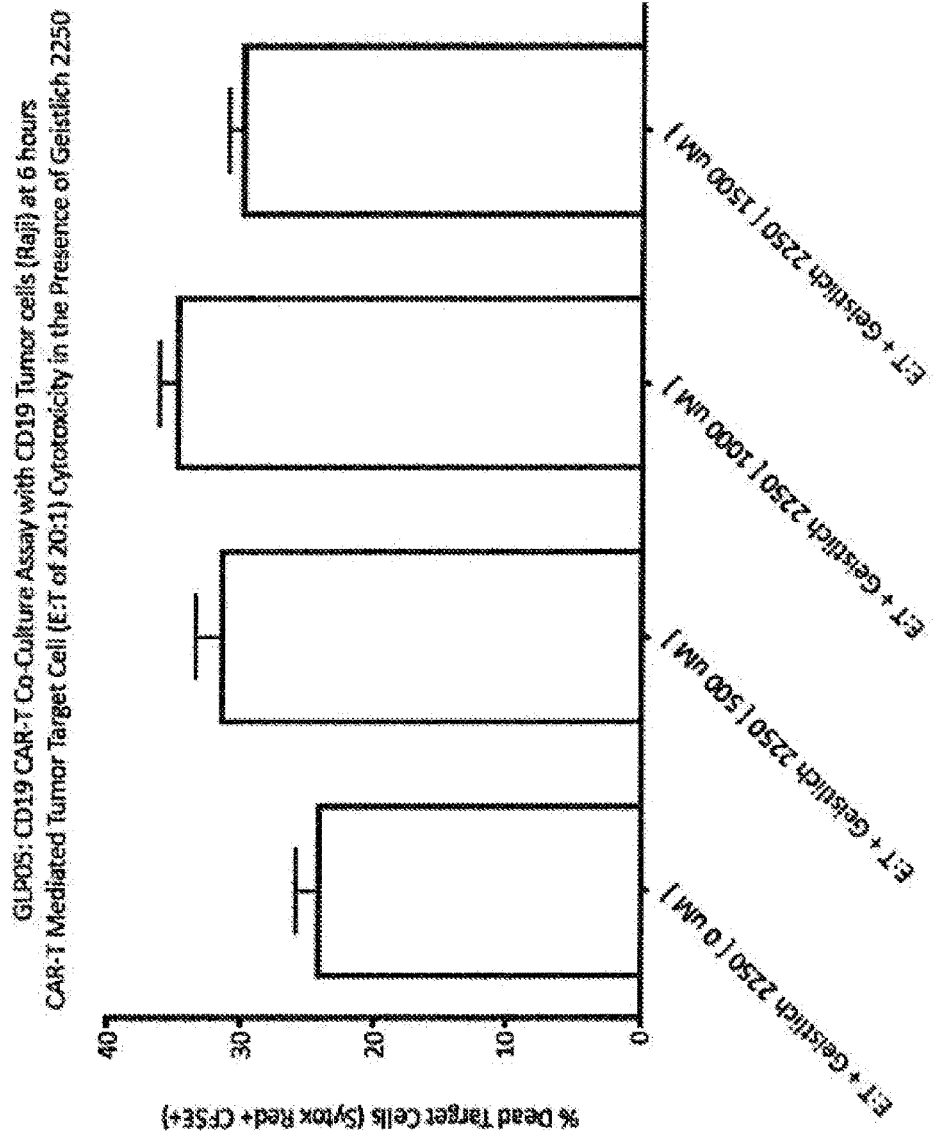
Figure 3A:
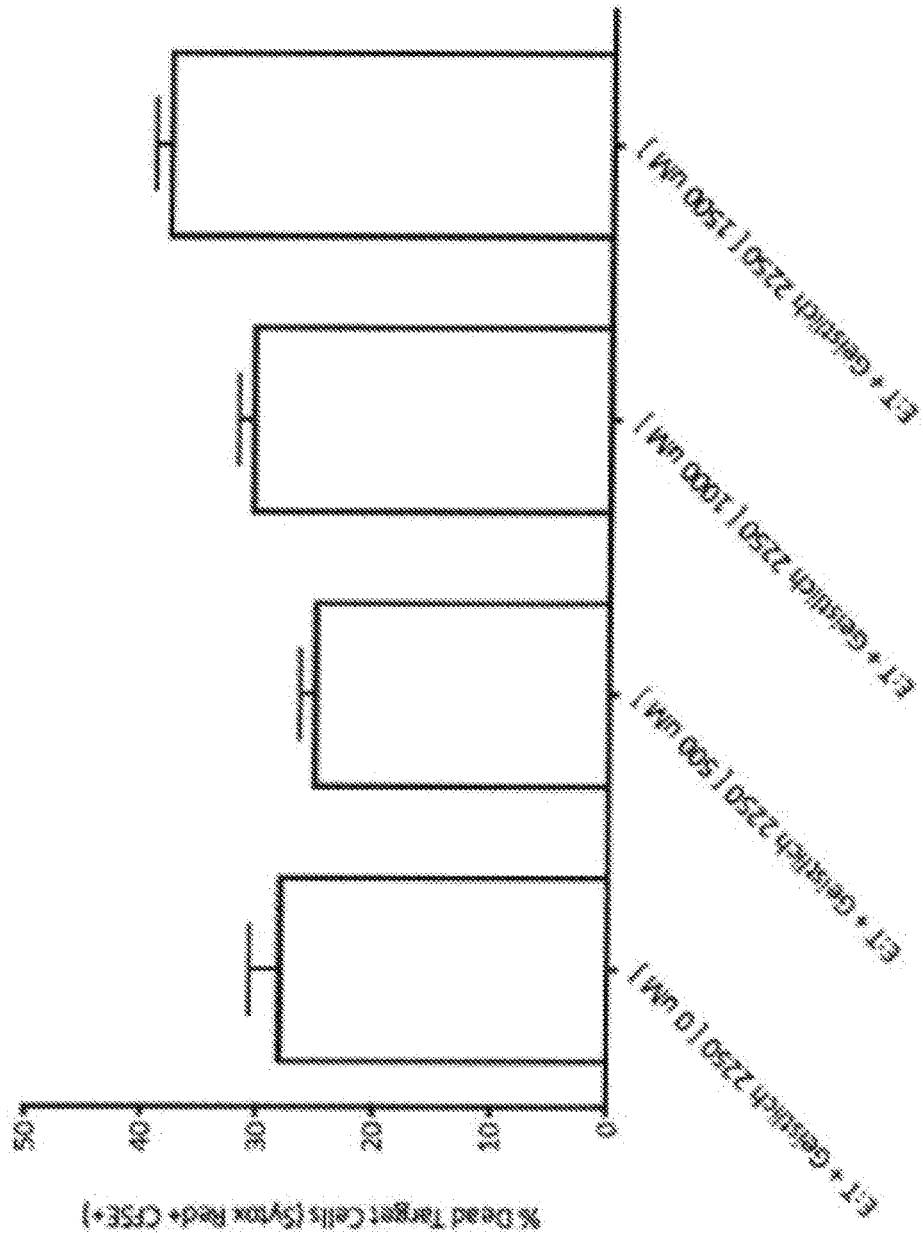
FIGS. 3A-3C show the results of CD19 CAR-T co-culture assay with CD-19 tumor cells (Raji) at 24 hours, CAR-T mediated tumor target cell in the present of increasing concentrations of C-2250 are shown (E:T ratios of 5:1, 10:1, and 20:1 are shown in FIGS. 3A, 3B, and 3C, respectively).
Figure 3B:
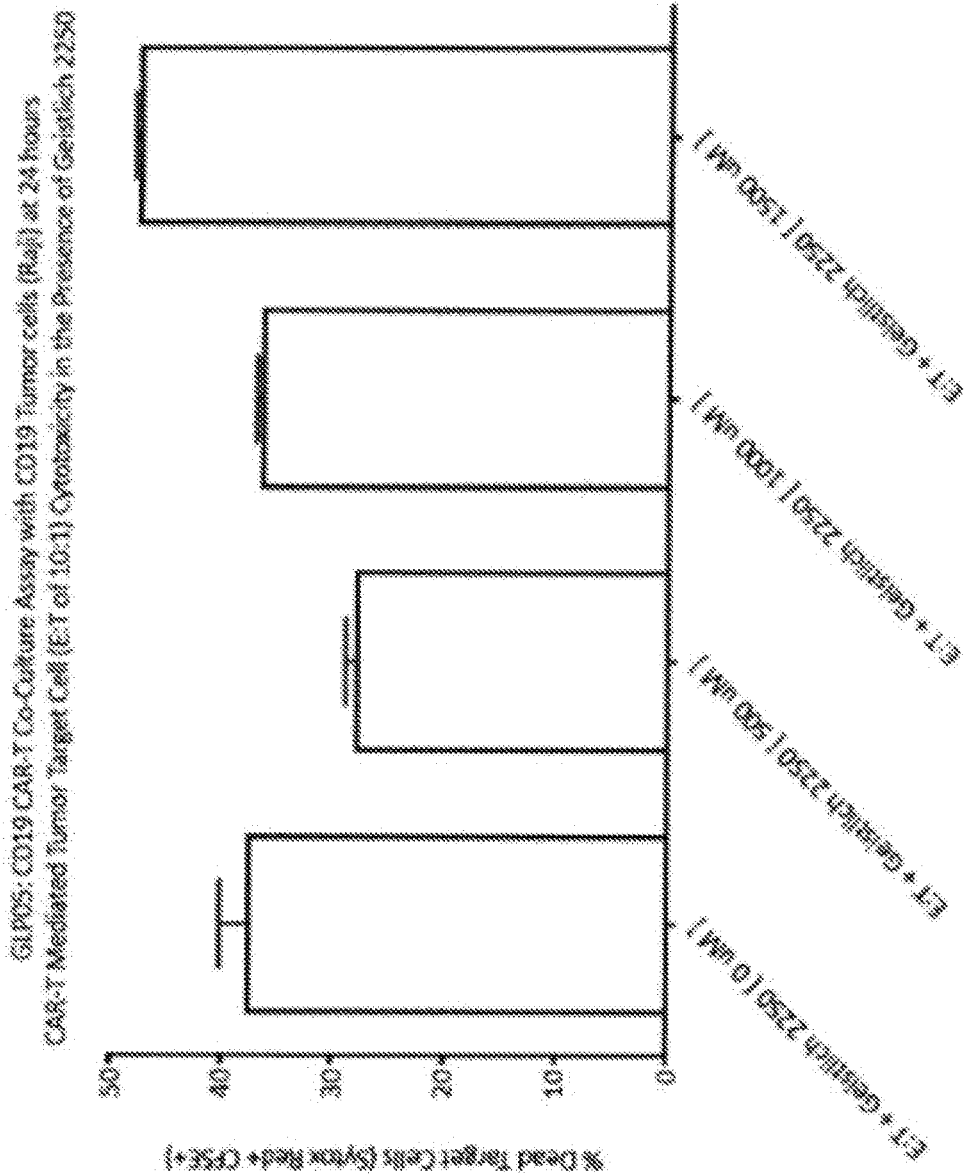
Figure 3C:
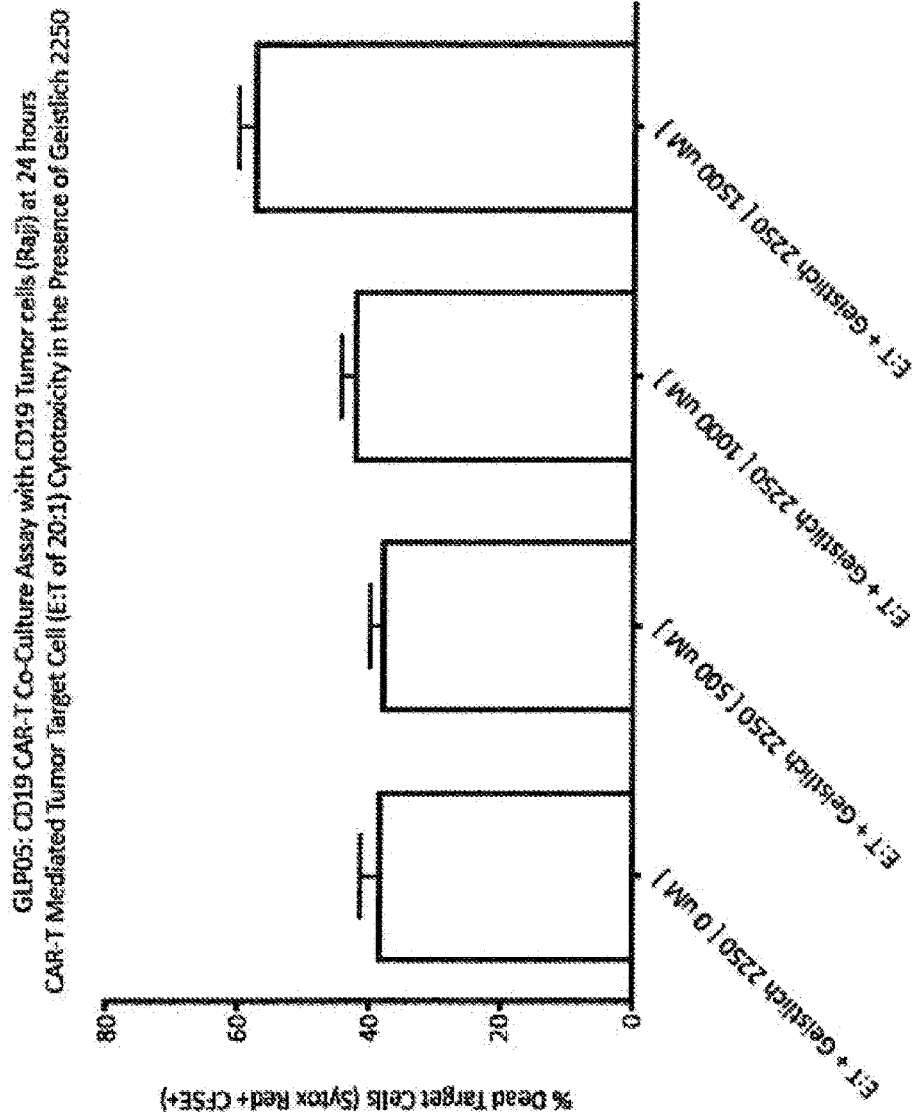

FIGS. 2A-2C show the results of CD19 CAR-T co-culture assay with CD-19 tumor cells (Raji) at 6 hours, CAR-T mediated tumor target cell in the present of increasing concentrations of C-2250 are shown (E:T ratios of 5:1, 10:1, and 20:1 are shown in FIGS. 2A, 2B, and 2C, respectively). FIGS. 3A-3C show the results of CD19 CAR-T co-culture assay with CD-19 tumor cells (Raji) at 24 hours, CAR-T mediated tumor target cell in the present of increasing concentrations of C-2250 are shown (E:T ratios of 5:1, 10:1, and 20:1 are shown in FIGS. 3A, 3B, and 3C, respectively).

Figure 4:
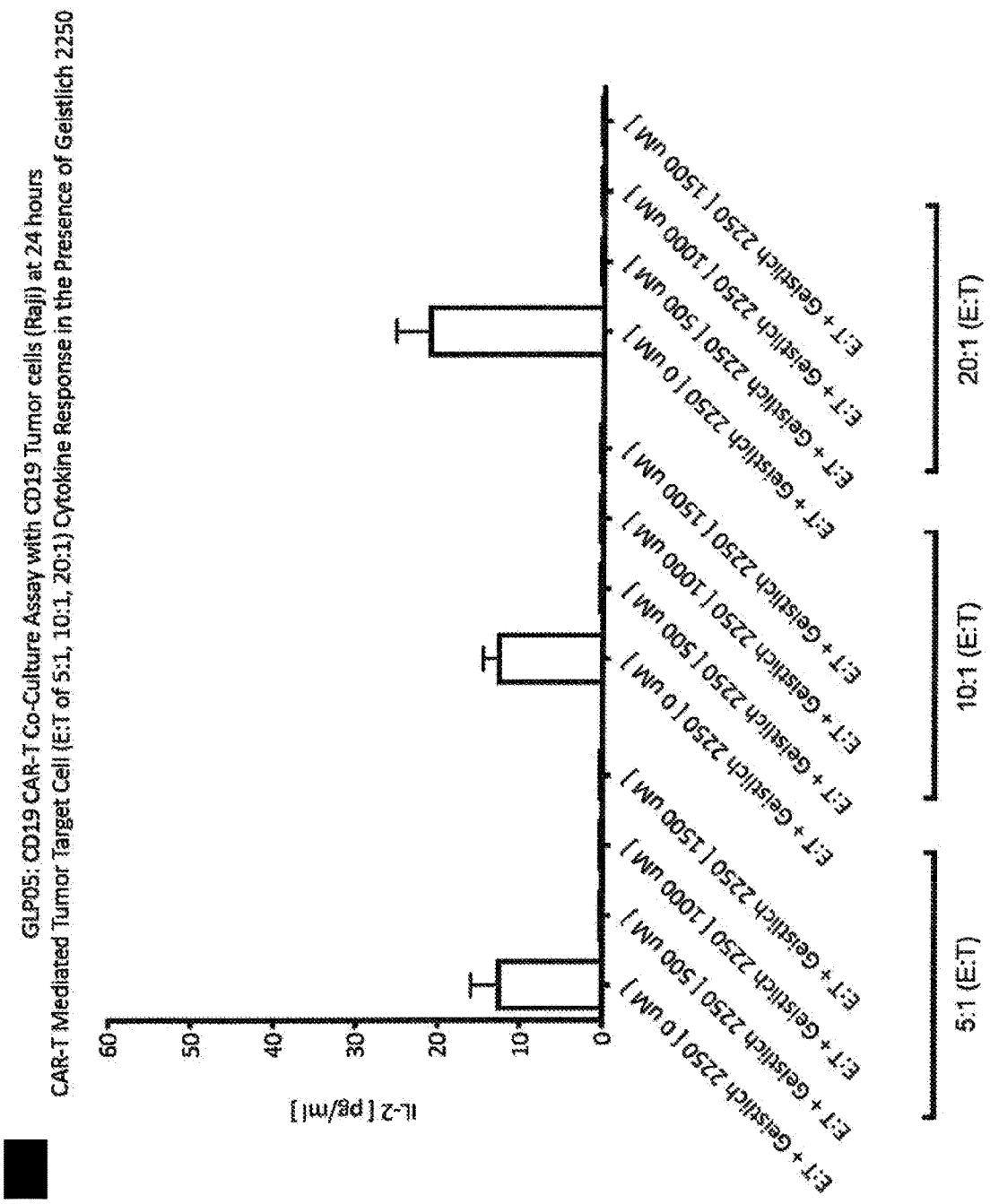
FIG. 4 shows the effect of C-2250 on CD19 CAR-T cell mediated IL-2 cytokine release across different effector to target ratios.
Figure 5:
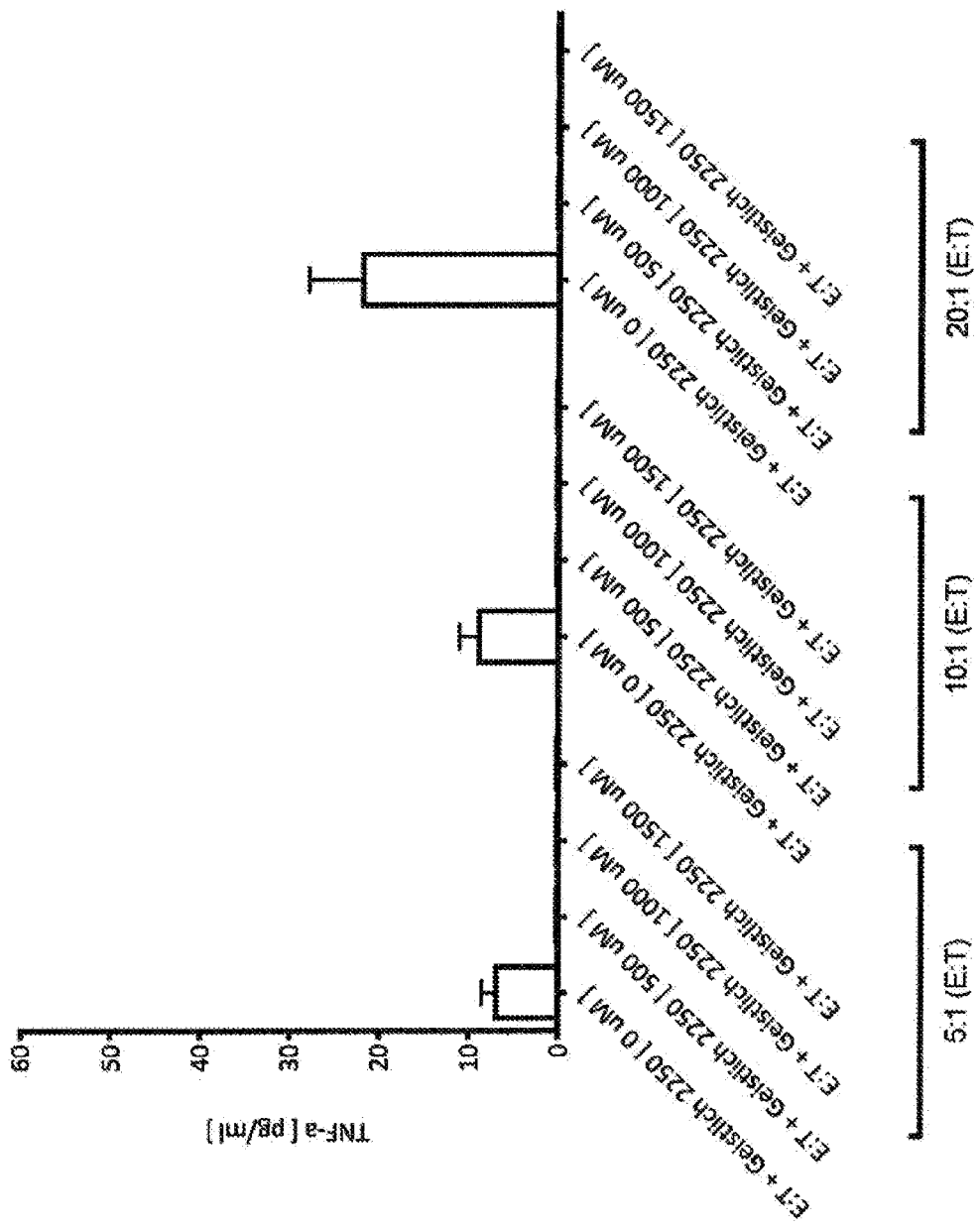
FIG. 5 shows the effect of C-2250 on CD19 CAR-T cell mediated TNF-α cytokine release across different effector to target ratios.
Figure 6:
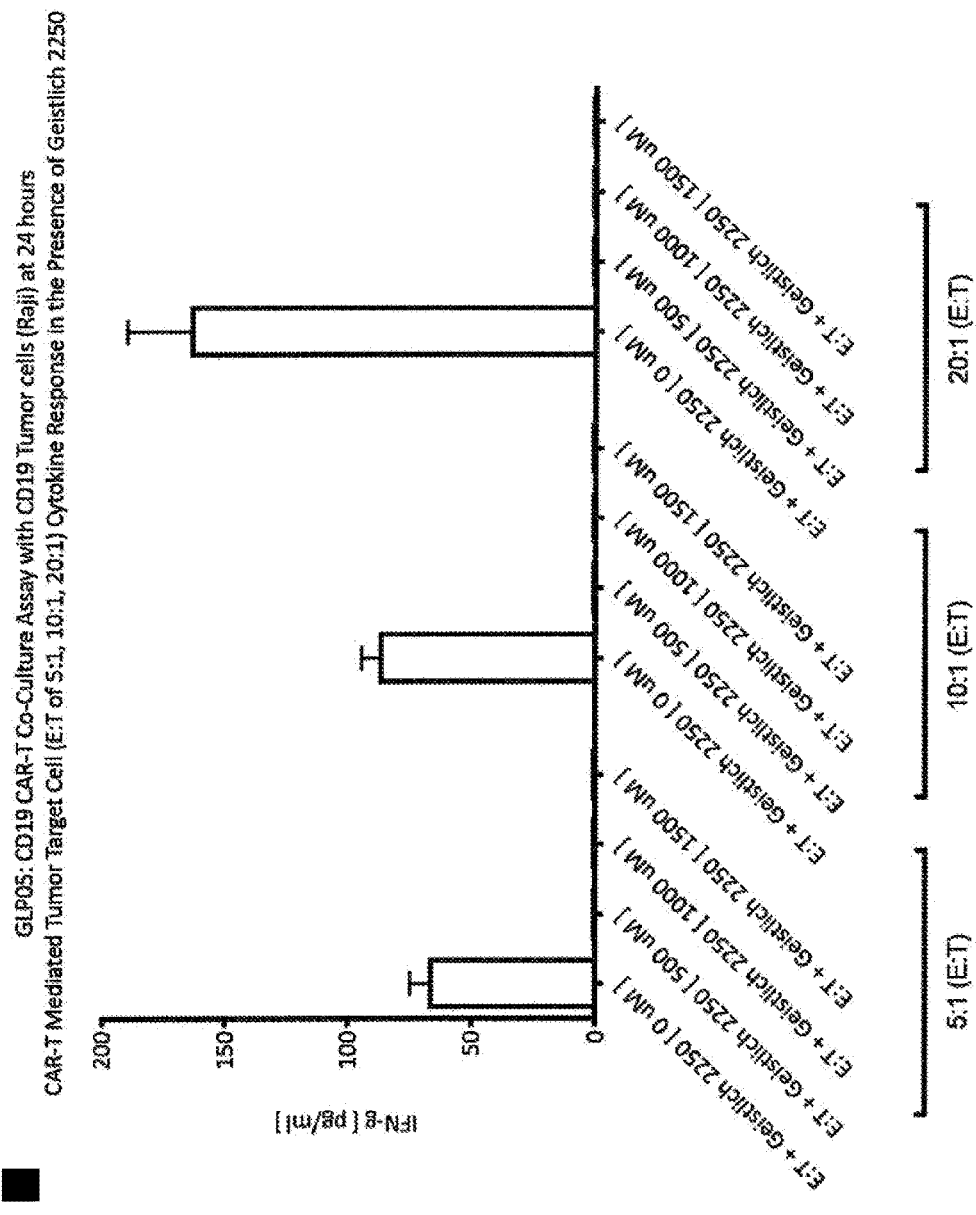
FIG. 6 shows the effect of C-2250 on CD19 CAR-T cell mediated IFN-γ cytokine release across different effector to target ratios.

FIG. 4 shows that C-2250 reduces CD19 CAR-T cell mediated IL-2 cytokine release across different effector to target ratios. FIG. 5 shows that C-2250 reduces CD19 CAR-T cell mediated TNF-α cytokine release across different effector to target ratios. FIG. 6 shows that C-2250 reduces CD19 CAR-T cell mediated IFN-γ cytokine release across different effector to target ratios.

C-2250 does not abrogate CD19 CAR-T mediated CD19$^+$ tumor target cell cytotoxicity at different effector to target cell ratios at 6 hours or 24 hours. C-2250 shuts down cytokine release (including IL-1β, IL-6, TNF-α, and IFN-γ cytokines).

Example 3

Inhibition of cytokine release by C-2250 in the presence of a bispecific CD19 T cell engager was assessed. Human PBMCs from ten donors were co-cultured with Ramos cells (a human CD19 expressing B cell line) in the presence of blinatumomab (BLINCYTO®), a T cell bispecific therapeutic, and C-2250 was added. BLINCYTO® was used at a fixed concentration of 100 ng/ml, which has been shown to be functionally active in this co-culture system to induce T cell mediated CD19$^+$ target cell (Ramos) cytotoxicity and cytokine release responses.

Co-culture was performed for 24 hours at 37° C., 5% $CO_2$, prior to harvesting cells or tissue culture supernatant for analysis. C-2250 was used at 500, 1000, and 1500 µM concentrations and was allowed to pre-incubate with T cells prior to addition of BLINCYTO®.

Figure 7:
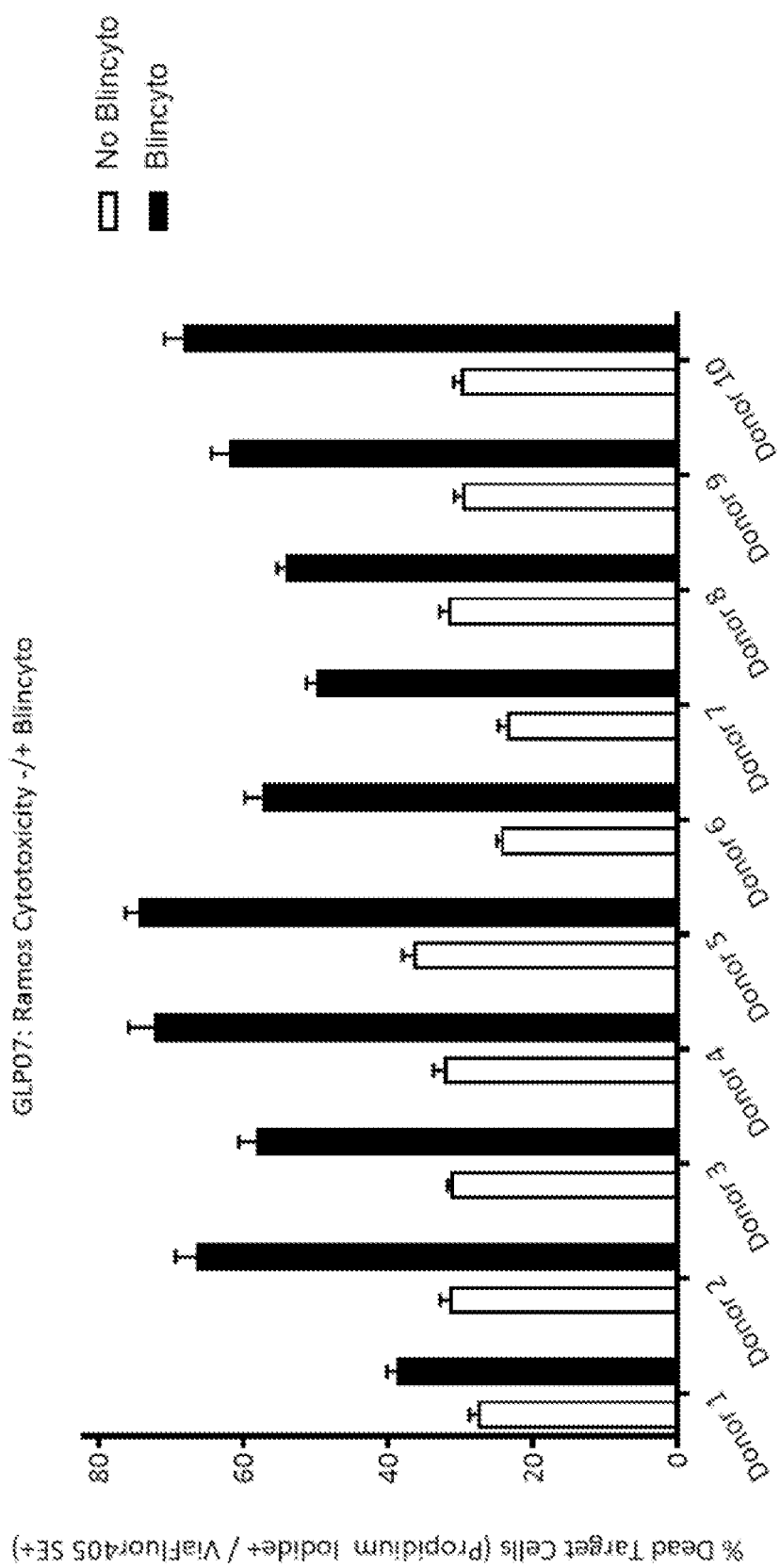
FIG. 7 shows target cell cytotoxicity of BLINCYTO® in Ramos cells of tested donors.

FIG. 7 shows that BLINCYTO® increased target cell cytotoxicity in Ramos cells of all tested donors.

Figure 8:
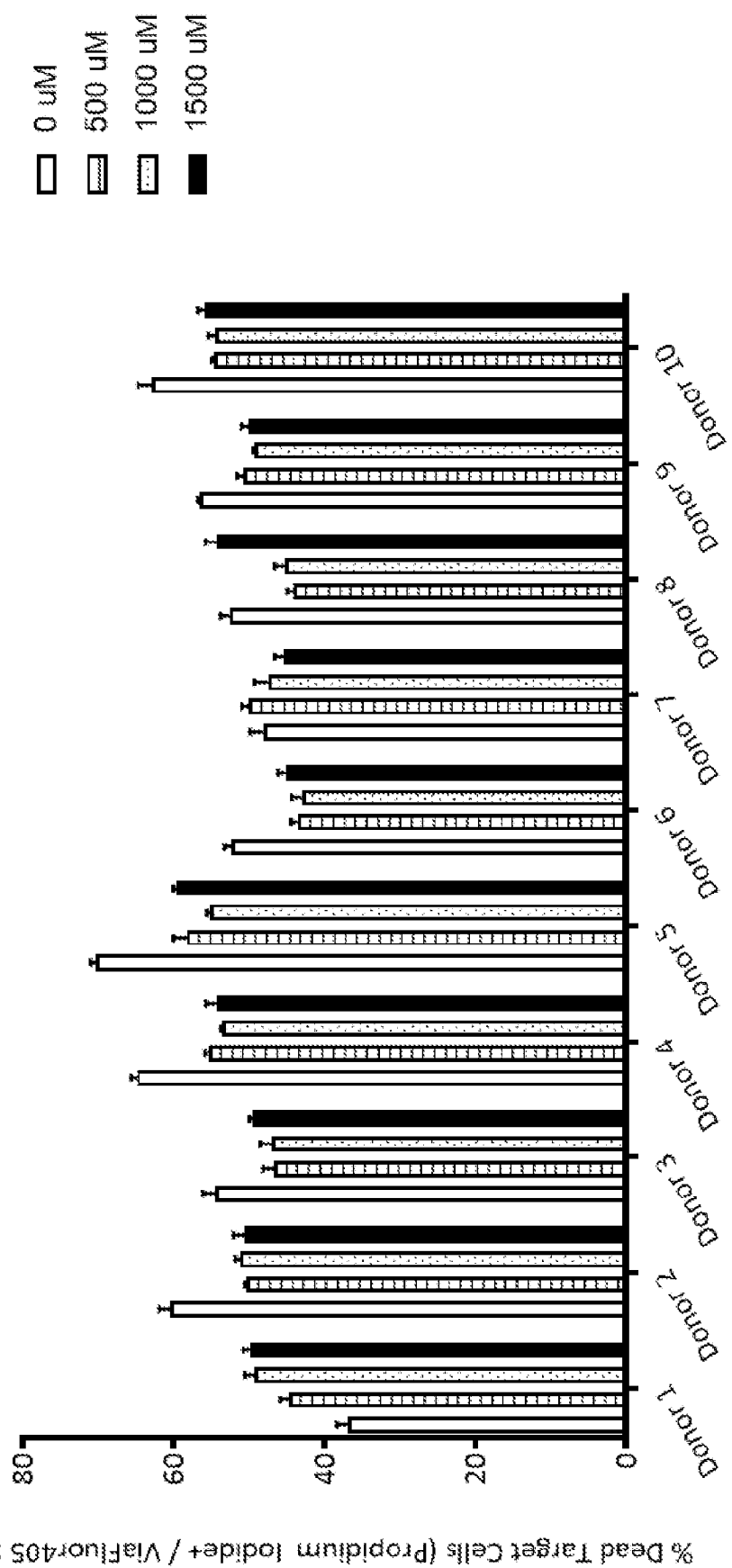
FIG. 8 shows the effect of C-2250 on BLINCYTO® mediated CD19+ tumor target cell cytotoxicity.

FIG. 8 shows that C-2250 did not reduce BLINCYTO® mediated CD19$^+$ tumor target cell cytotoxicity.

Figure 9A:
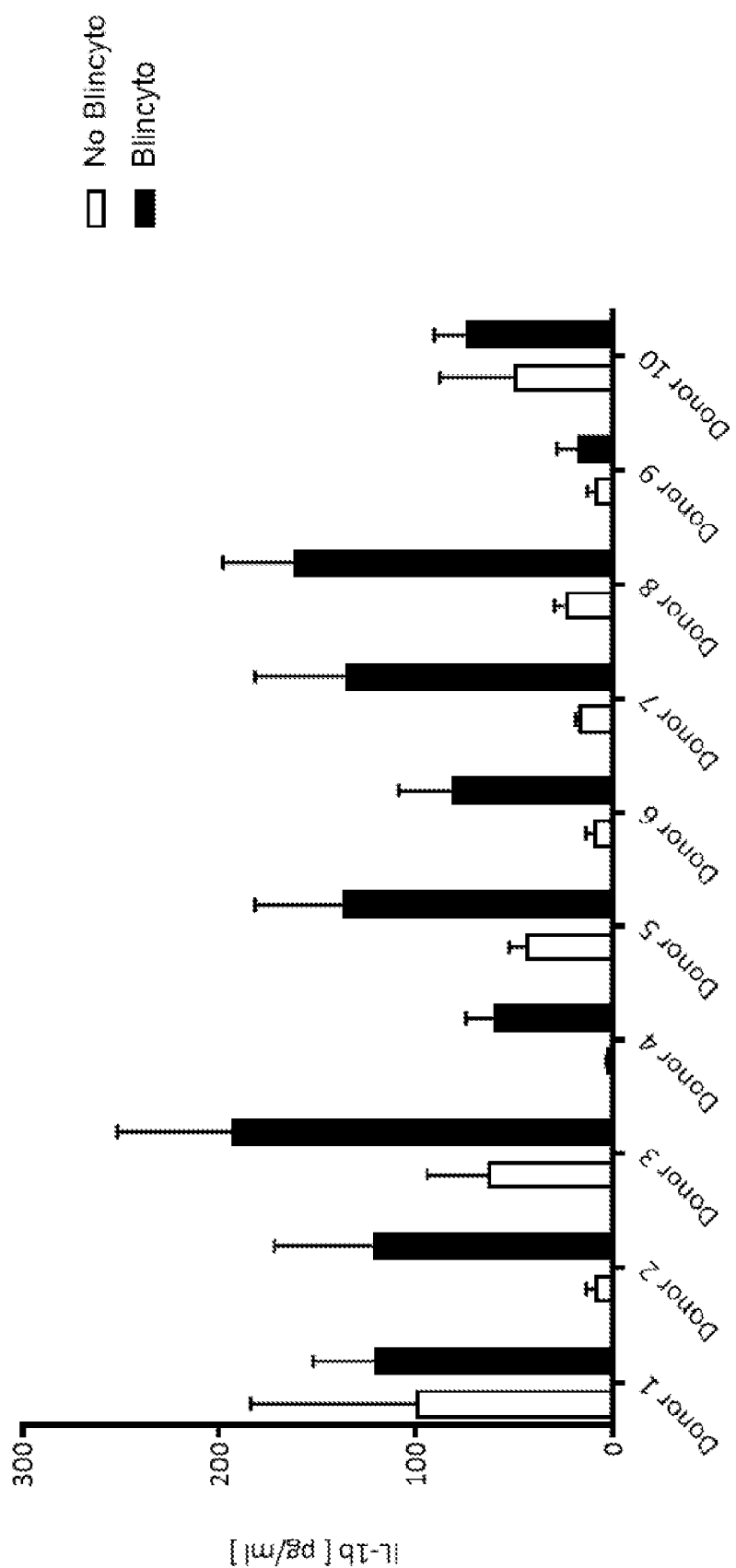
FIG. 9A shows the effect of BLINCYTO® on IL-1 cytokine release in the tested donors.
Figure 9B:
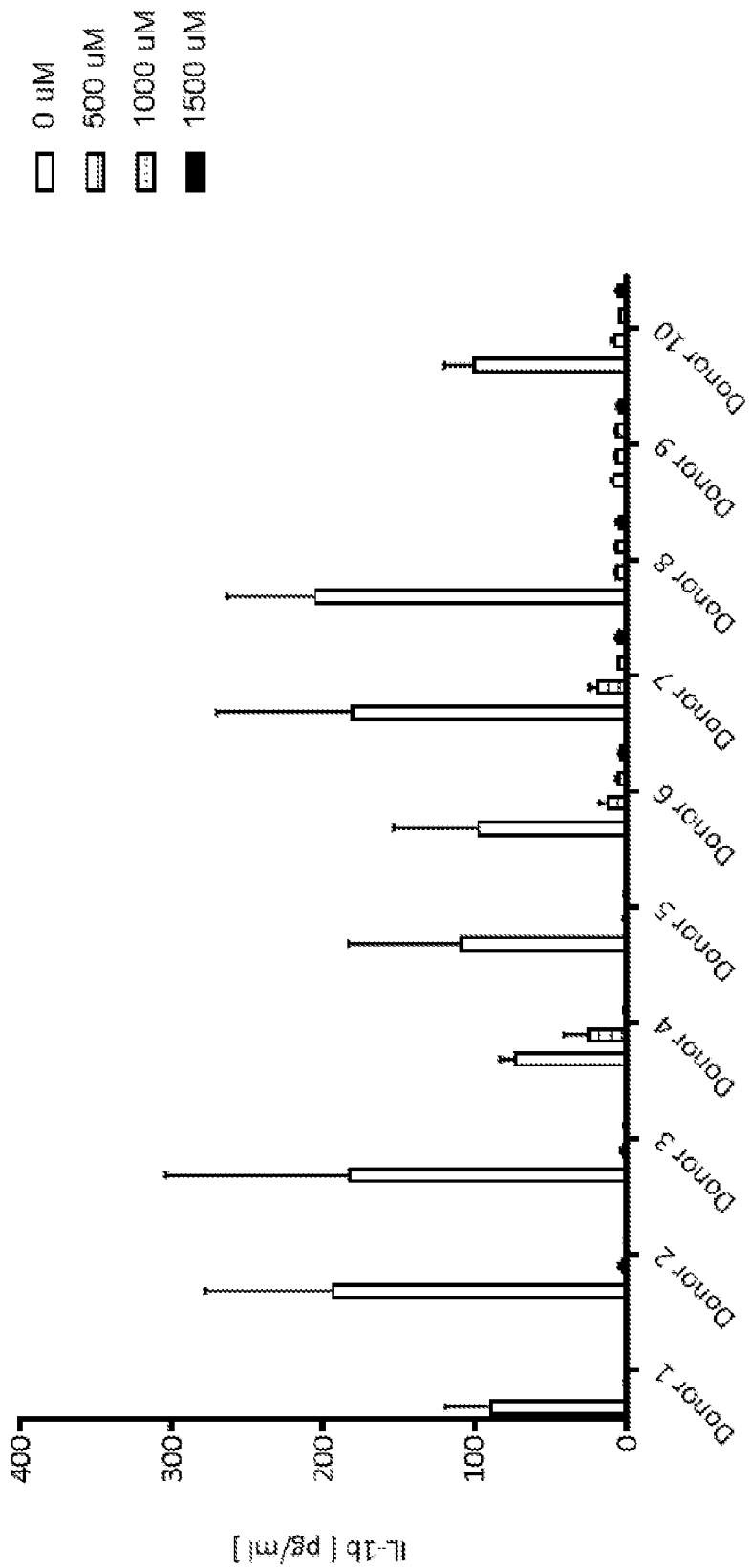

FIG. 9A shows the effect of BLINCYTO® on IL-1β cytokine release in the tested donors. FIG. 9B shows that C-2250 reduced BLINCYTO® T-cell mediated IL-1β cytokine release in the tested donors.

Figure 10A:
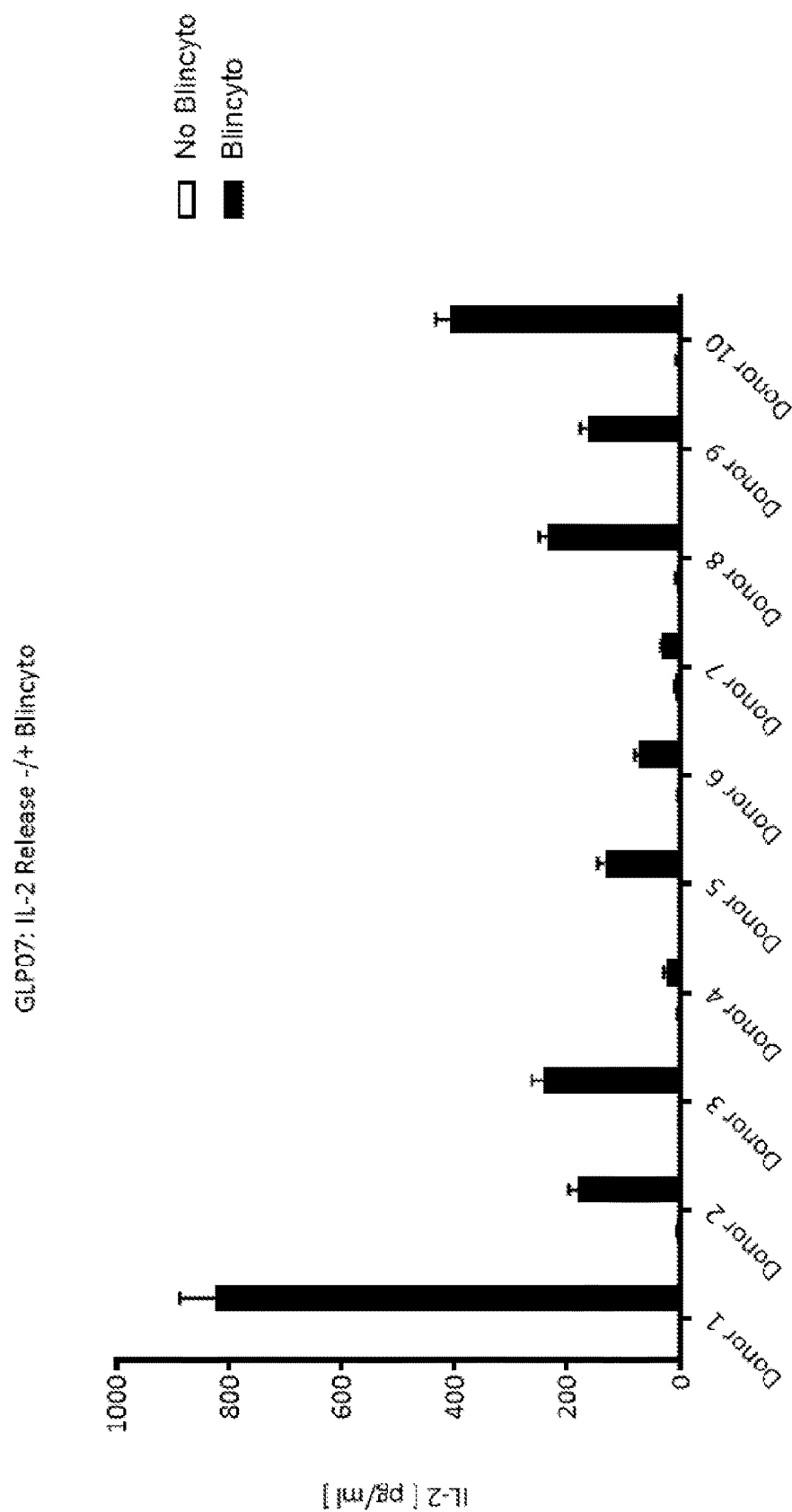
FIG. 10A shows the effect of BLINCYTO® on IL-2 cytokine release in the tested donors.
Figure 10B:
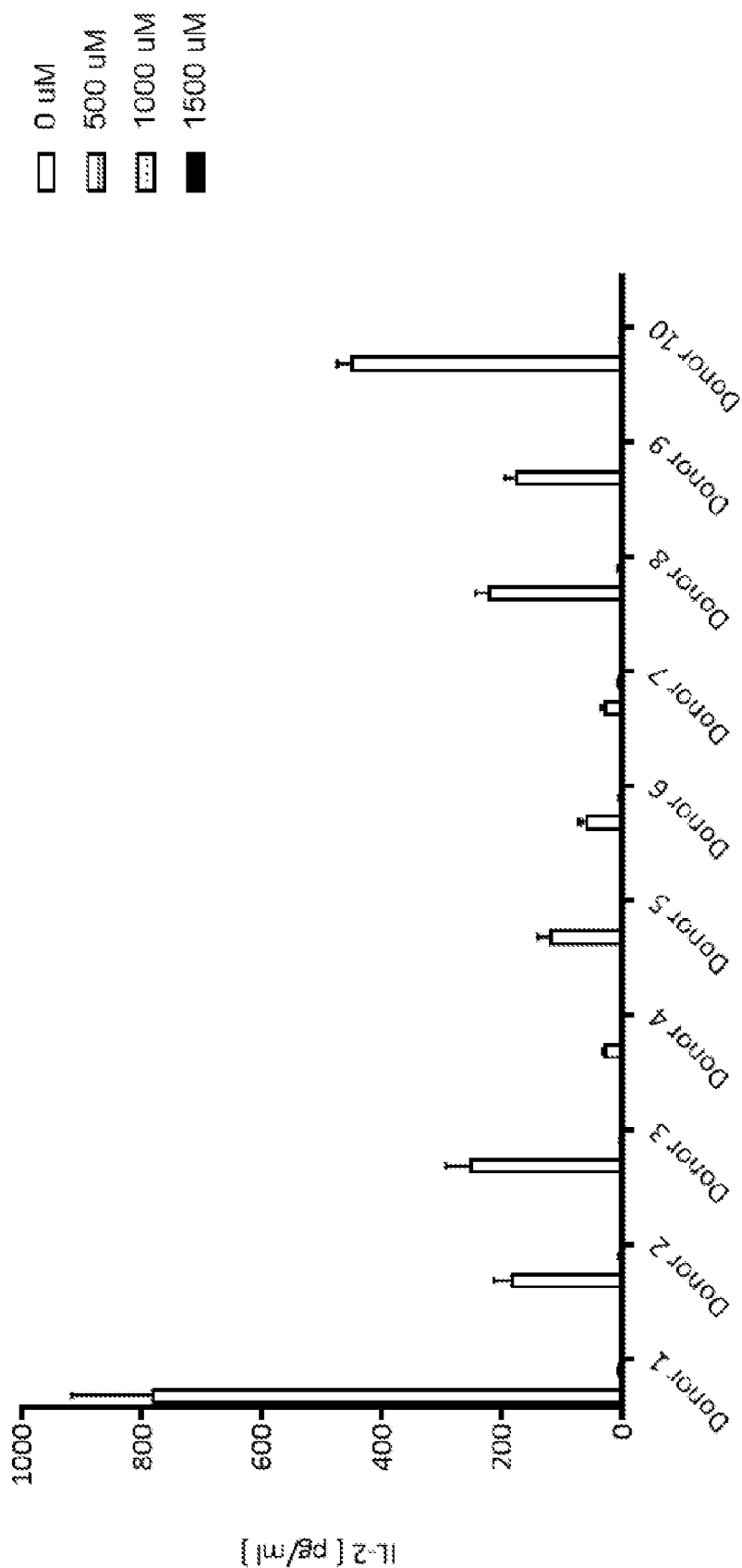
FIG. 10B shows the effect of C-2250 on BLINCYTO® T-cell mediated IL-1β cytokine release in the tested donors.

FIG. 10A shows the effect of BLINCYTO® on IL-2 cytokine release in the tested donors. FIG. 10B shows that C-2250 reduced BLINCYTO® T-cell mediated IL-2 cytokine release in the tested donors.

Figure 11A:
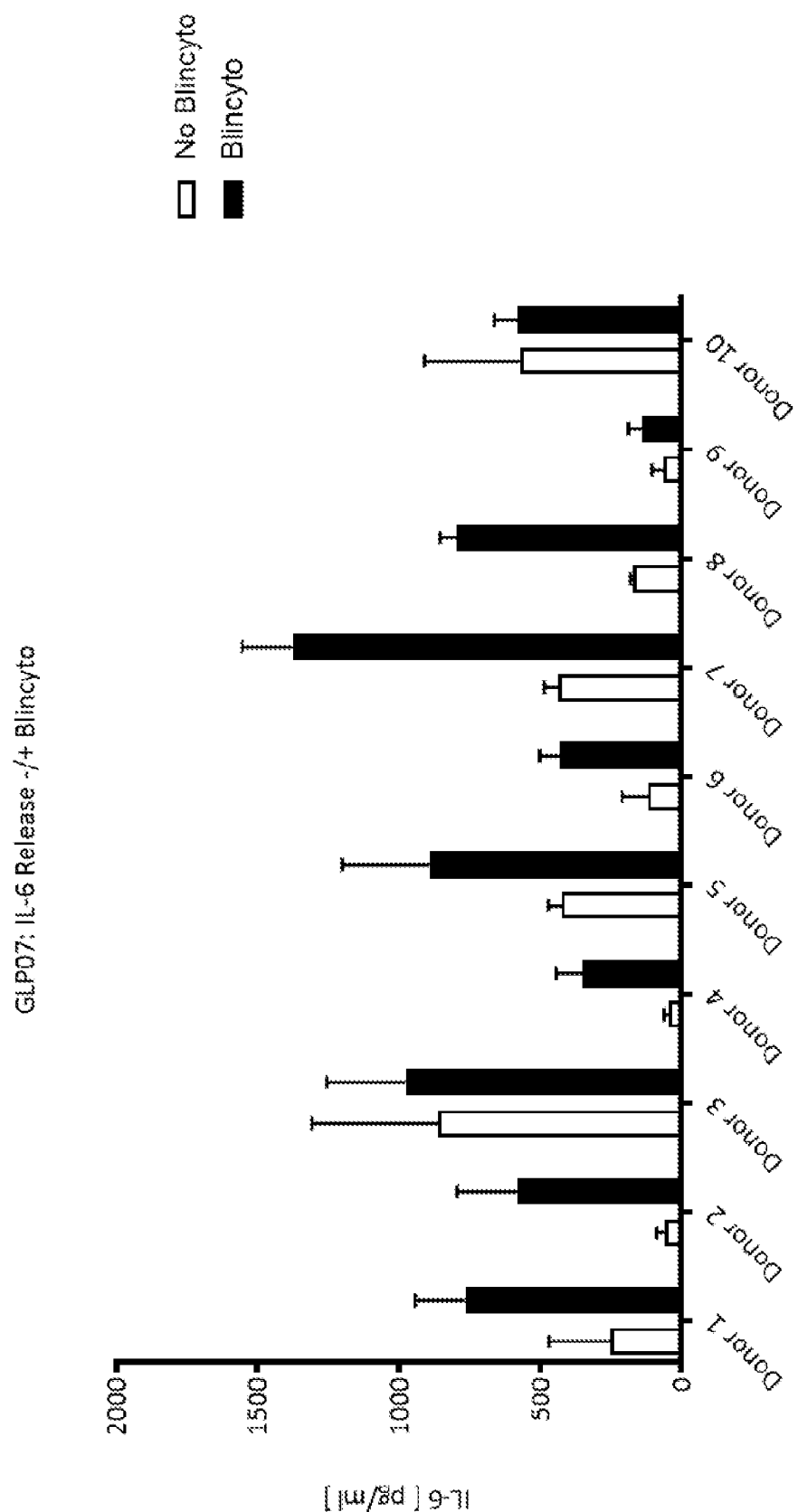
FIG. 11A shows the effect of BLINCYTO® on IL-6 cytokine release in the tested donors.
Figure 11B:
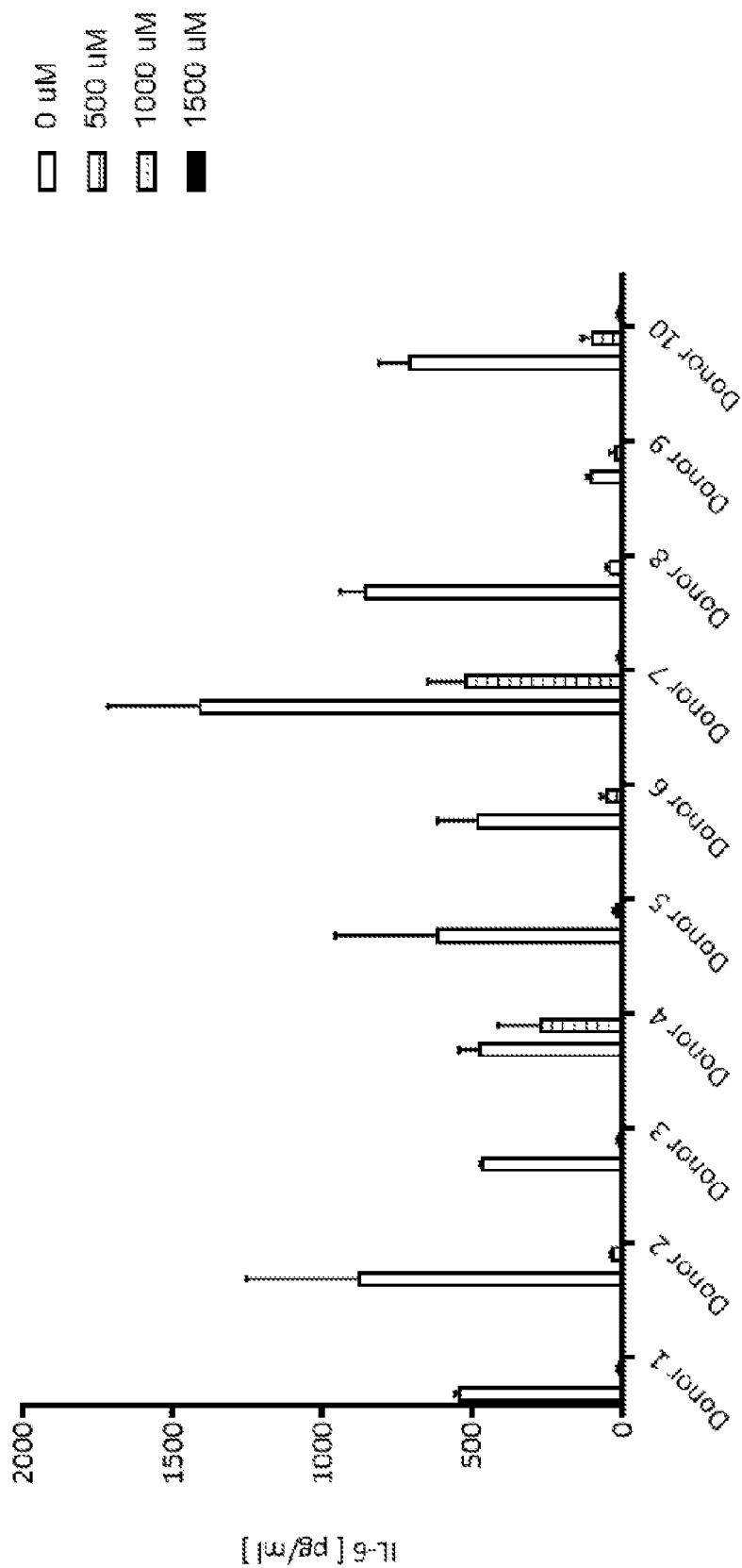
FIG. 11B shows the effect of C-2250 on BLINCYTO® T-cell mediated IL-6 cytokine release in the tested donors.

FIG. 11A shows the effect of BLINCYTO® on IL-6 cytokine release in the tested donors. FIG. 11B shows that C-2250 reduced BLINCYTO® T-cell mediated IL-6 cytokine release in the tested donors.

Figure 12A:
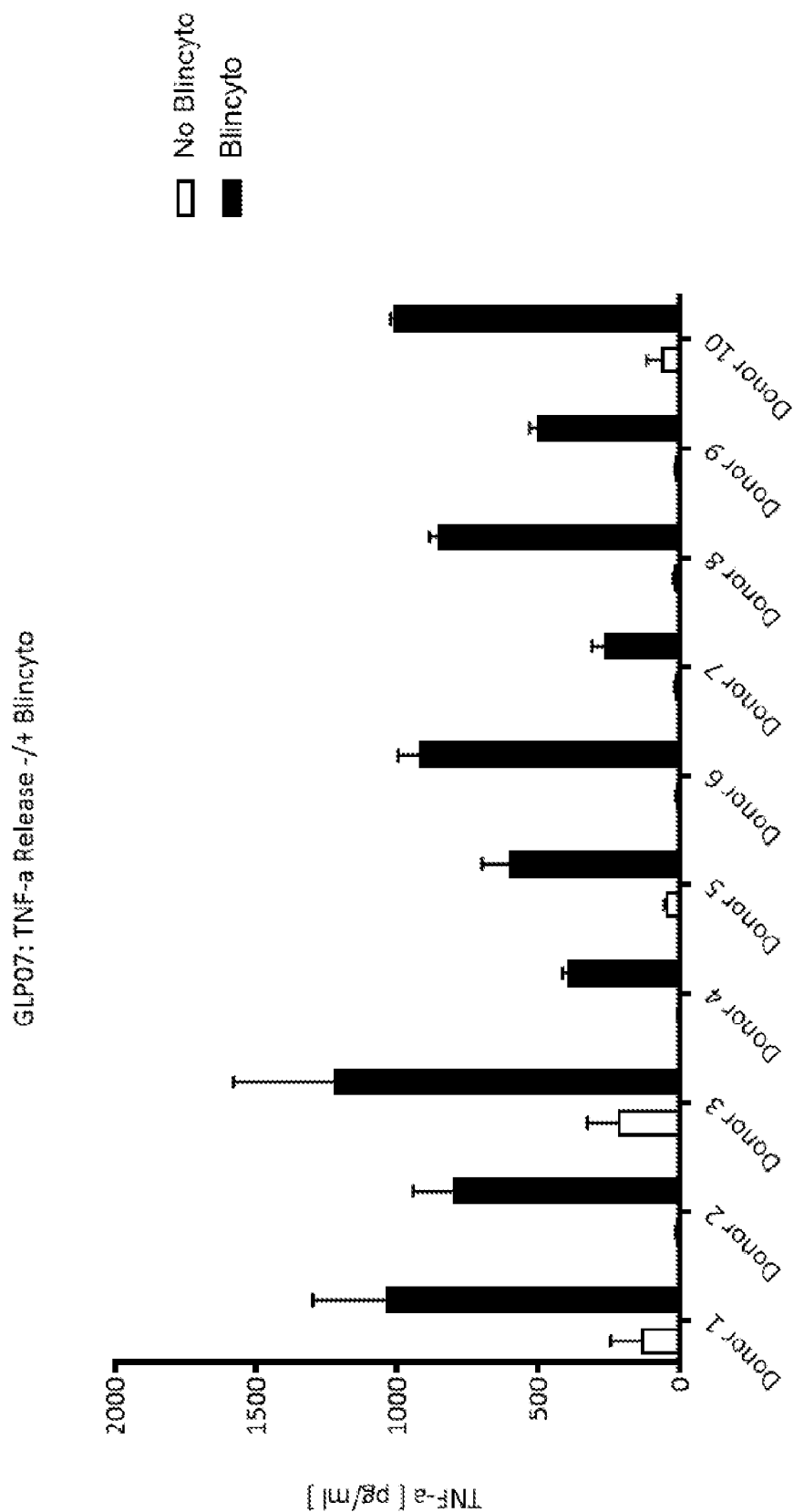
FIG. 12A shows the effect of BLINCYTO® on TNF-α cytokine release in the tested donors.
Figure 12B:
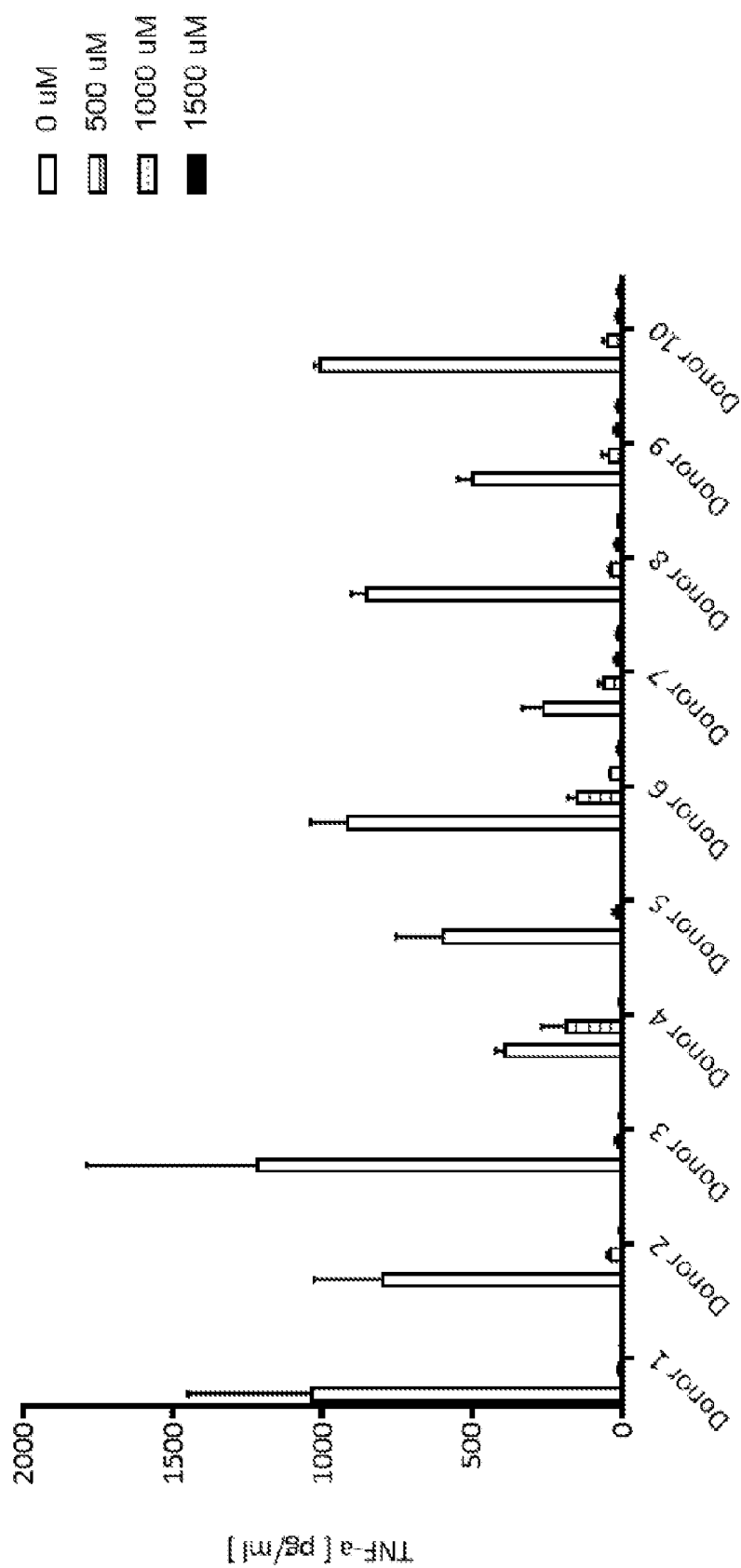
FIG. 12B shows the effect of C-2250 on BLINCYTO® T-cell mediated TNF-α cytokine release in the tested donors.

FIG. 12A shows the effect of BLINCYTO® on TNF-α cytokine release in the tested donors. FIG. 12B shows that C-2250 reduced BLINCYTO® T-cell mediated TNF-α cytokine release in the tested donors.

Figure 13A:
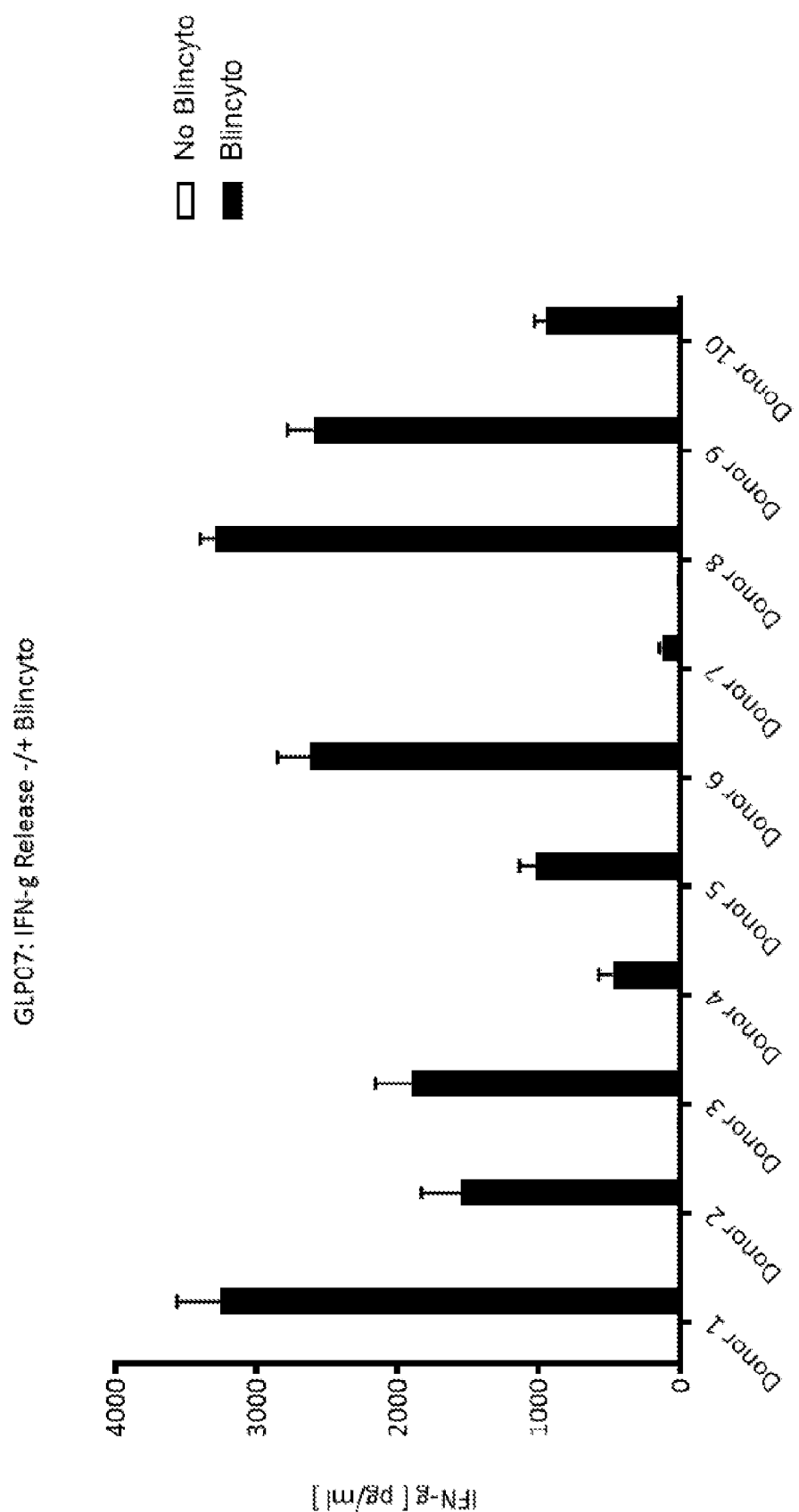
FIG. 13A shows the effect of BLINCYTO® on IFN-γ cytokine release in the tested donors.
Figure 13B:
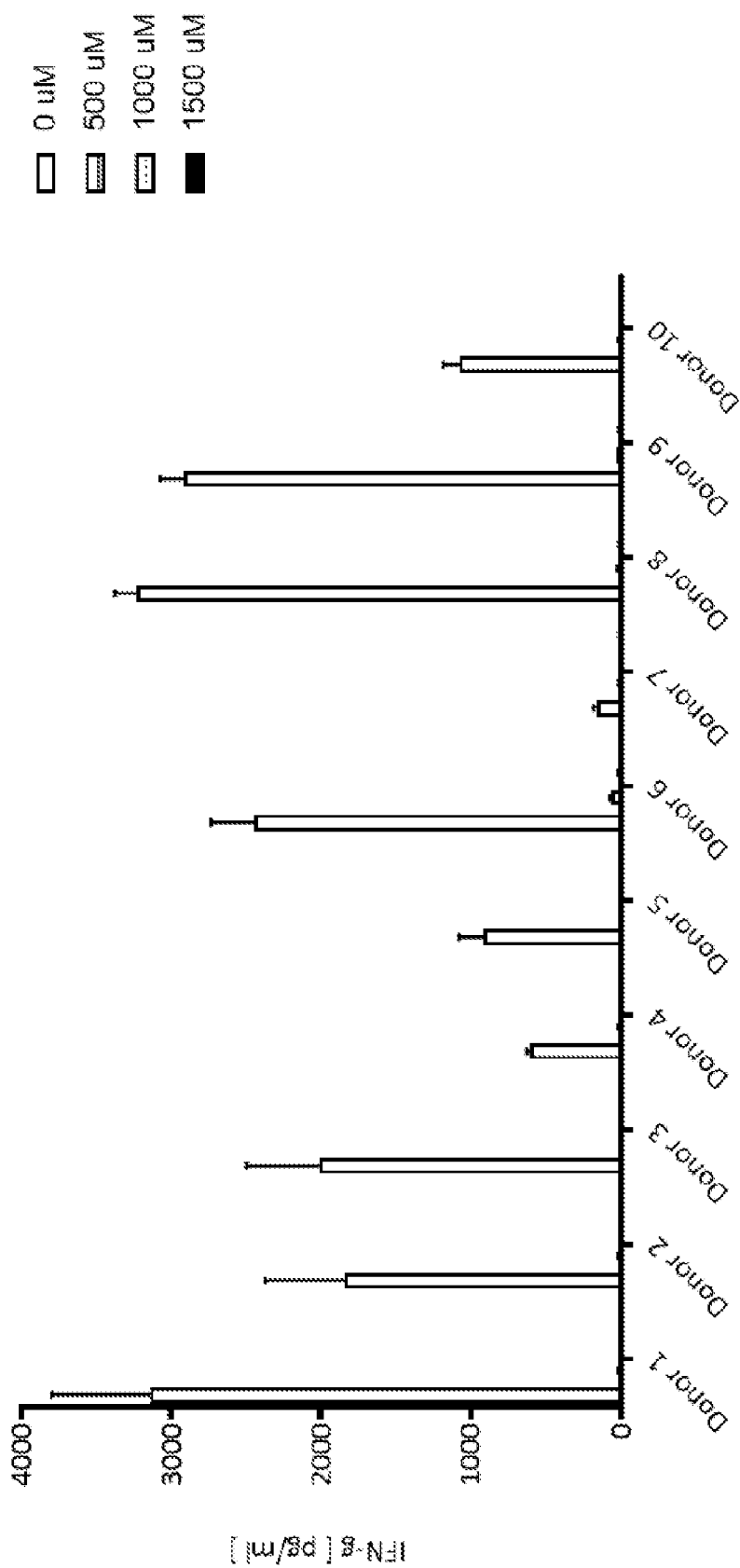
FIG. 13B shows the effect of C-2250 on BLINCYTO® T-cell mediated IFN-γ cytokine release in the tested donors.

FIG. 13A shows the effect of BLINCYTO® on IFN-γ cytokine release in the tested donors. FIG. 13B shows that C-2250 reduced BLINCYTO® T-cell mediated IFN-γ cytokine release in the tested donors.

The results demonstrated that C-2250 surprisingly did not reduce the degree of BLINCYTO® mediated CD19$^+$ tumor target cell cytotoxicity, but reduced release of all of the tested cytokines.

Figure 14:
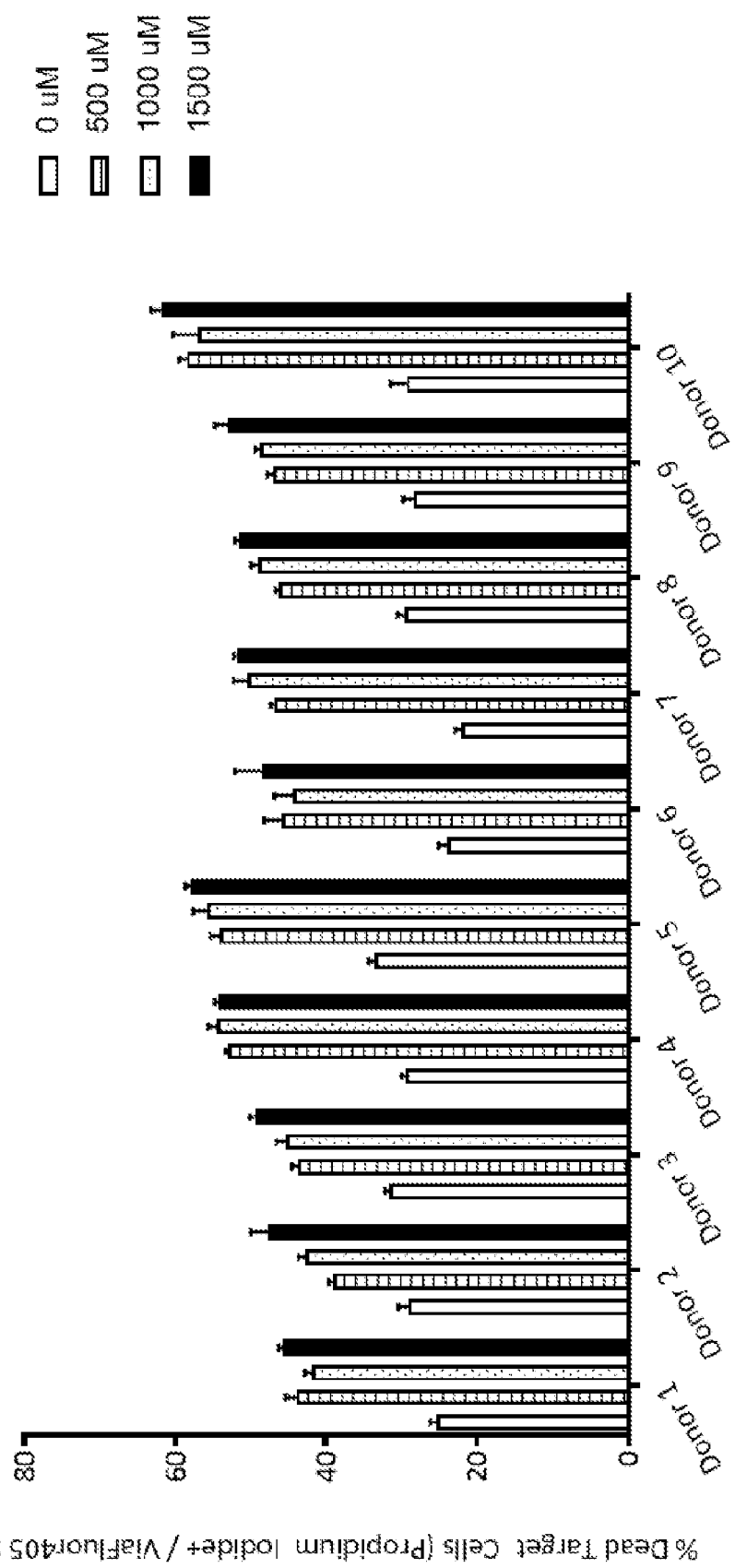
FIG. 14 shows the effect of C-2250 on tumor target cytotoxicity in the absence of BLINCYTO®.

FIG. 14 shows that C-2250 increased tumor target cytotoxicity in the absence of BLINCYTO®.

While the subject matter of this disclosure has been described and shown in considerable detail with reference to certain illustrative examples, including various combinations and sub-combinations of features, those skilled in the art will readily appreciate other aspects and variations and modifications thereof as encompassed within the scope of the present disclosure. Moreover, the descriptions of such aspects, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

What is claimed is:

1. A method of inhibiting, or reducing an increase in blood levels of one or more cytokines in a subject in need thereof that has cancer, and is undergoing T-cell engaging therapy, chimeric antigen receptor-expressing T-cell (CAR T-cell) cancer therapy, or antibody therapy, the method comprising the step of administering a composition comprising compound 2250

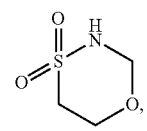

2250 a pharmaceutically acceptable salt, hydrate, ester, prodrug, or solvate thereof to the subject, and thereby inhibiting or reducing release of at least one cytokine in said subject.

2. The method of claim 1, wherein the at least one cytokine is IL-1β, IL-1RA, IL-2, IL-4, IL-6, IL-8, IL-10, IL-12, IP-10, IFN-α, IFN-γ, G-CSF, or TNF-α.

3. The method of claim 1, wherein the subject is undergoing T-cell engaging therapy.

4. The method of claim 1, wherein the subject is undergoing chimeric antigen receptor-expressing T-cell (CAR T-cell) cancer therapy, or bispecific antibody therapy.

5. The method of claim 1, wherein administration of said composition occurs prior to, concurrent with, or following CAR T-cell therapy, antibody therapy or bispecific antibody therapy.

6. The method of claim 1, wherein the composition is administered 12 to 96 hours prior to initiation of CAR T-cell therapy or bispecific antibody therapy.

7. The method of claim 1, further comprising monitoring the subject for onset of fever as a clinical sign of impending CRS or cytokine storm in patients receiving T cell-engaging therapy and administering compound 2250 within 24 hours of the onset of fever.

8. The method of claim 1, further comprising monitoring the subject for one or more biomarkers indicative of impending CRS or cytokine storm in patients receiving T cell-engaging therapies and administering compound 2250 within 24 hours of detection of the one or more biomarkers.

9. The method of claim 8, wherein the one or more biomarkers indicative of impending CRS is an increased serum, blood or tissue level of one or more of IL-1β, IL-1RA, IL-2, IL-4, IL-6, IL-8, IL-10, IL-12, IP-10, IFN-α, IFN-γ, G-CSF, and TNF-α.

10. The method of claim 1, wherein the composition is administered at least biweekly for 4 to 8 weeks.

11. The method of claim 1, wherein said method does not reduce efficacy of said CAR T-cell cancer therapy or antibody therapy.

12. The method of claim 1, wherein the subject further suffers from one or more disease conditions selected from at least one of cachexia, septic shock syndrome, a chronic inflammatory response, traumatic brain injury, a neuromyelitis optica spectrum disorder (NMSOD), cerebral cytokine storm, graft versus host disease (GVHD), autoimmune diseases, multiple sclerosis, acute pancreatitis, or hepatitis.

13. The method of claim 1, wherein the subject is treated with anti-CD19 Chimeric Antigen Receptor (CAR) T cells.

14. A method of treating, inhibiting or reducing the incidence of a cytokine release syndrome (CRS) or a cytokine storm in a subject in need thereof that has cancer and is undergoing T-cell engaging therapy, chimeric antigen receptor-expressing T-cell (CAR T-cell) cancer therapy, or antibody therapy, the method comprising the step of administering a composition comprising compound 2250

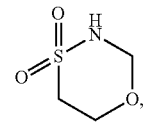

2250 a pharmaceutically acceptable salt, hydrate, ester, prodrug, or solvate thereof, or a combination thereof to the subject in need thereof that has cancer and is at risk of CRS or cytokine storm due to T-cell engaging therapy, chimeric antigen receptor-expressing T-cell (CAR T-cell) cancer therapy, or antibody therapy.

15. The method of claim 14, wherein the subject is experiencing CRS or cytokine storm CRS or cytokine storm.

16. The method of claim 14, wherein said subject is undergoing CAR T-cell cancer therapy or antibody therapy and said method does not reduce the efficacy of said CAR T-cell cancer therapy, antibody therapy or bispecific antibody therapy.

* * * * *